(12) United States Patent
Enapakurthi et al.

(10) Patent No.: US 12,498,247 B2
(45) Date of Patent: Dec. 16, 2025

(54) ENHANCEMENTS TO MAP RELIABILITY

(71) Applicant: QUALCOMM Incorporated, San Diego, CA (US)

(72) Inventors: Vinod Kumar Enapakurthi, Vizianagaram (IN); Rajendra Varma Pusapati, Hyderabad (IN); Ravi Kumar Sepuri, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 18/520,450

(22) Filed: Nov. 27, 2023

(65) Prior Publication Data
US 2025/0172407 A1 May 29, 2025

(51) Int. Cl.
*G01C 21/00* (2006.01)

(52) U.S. Cl.
CPC ..... *G01C 21/3807* (2020.08); *G01C 21/3885* (2020.08)

(58) Field of Classification Search
None
See application file for complete search history.

(56) References Cited

U.S. PATENT DOCUMENTS 10,794,711 B2 * 10/2020 Wheeler ............ G06V 20/56
10,801,845 B2 * 10/2020 Wheeler ............ G01C 21/30
11,530,924 B2 * 12/2022 Lee ................. G01C 21/3848
2019/0293445 A1 * 9/2019 Cho ................. G08G 1/096827
2022/0042823 A1 * 2/2022 Lee ..................... G01C 11/02

FOREIGN PATENT DOCUMENTS

EP 3477258 A1 5/2019

OTHER PUBLICATIONS

International Search Report and Written Opinion—PCT/US2024/049436—ISA/EPO—Dec. 18, 2024.

* cited by examiner

*Primary Examiner* — Abdhesh K Jha
(74) *Attorney, Agent, or Firm* — Thien T. Nguyen

(57) ABSTRACT

An example method for enhancing high-definition (HD) map reliability, the method performed by a User Equipment (UE) and comprising applying a map update to a primary HD map based on a received map update, responsive to updating the primary HD map being successful, determining one or more structural feature changes of the updated primary HD map that correspond to real-world structural changes represented in the primary HD map, based on a difference between the updated primary HD map and the primary HD map, and responsive to a determination of the one or more structural feature changes, updating a backup HD map by applying the one or more structural feature changes to the backup HD map. The method further comprises providing the updated primary HD map and the updated backup HD map for navigation.

30 Claims, 8 Drawing Sheets

ENHANCEMENTS TO MAP RELIABILITY

BACKGROUND

1. Field of Disclosure

The present disclosure generally relates to high-definition (HD) maps in vehicle systems and, more specifically, to techniques for enhancing HD map reliability.

2. Description of Related Art

Map over the Air (MOTA) changes the way vehicles interact with their surroundings by providing real-time HD map data over a wireless network. Using MOTA allows vehicles to make informed decisions based on up-to-the-minute information about road and traffic conditions. Additionally, vehicles utilize these HD maps in conjunction with sensor data to enhance the accuracy and safety of autonomous driving and/or advanced driver assistance systems (ADAS).

BRIEF SUMMARY

An example method for enhancing high-definition (HD) map reliability, the method performed by a User Equipment (UE) and comprising receiving a map update wirelessly via at least one transceiver, updating a primary HD map based on a received map update, determining one or more structural feature changes of the updated primary HD map that correspond to real-world structural changes represented in the primary HD map, based on a difference between the updated primary HD map and the primary HD map, and updating a backup HD map by applying the one or more structural feature changes to the backup HD map. The method further comprises providing the updated primary HD map and the updated backup HD map for navigation.

An example UE for enhancing high-definition (HD) map reliability comprising one or more transceivers, one or more memories, and one or more processors communicatively coupled with the one or more transceivers and the one or more memories. The one or more processors are configured to receive a map update wirelessly via the one or more transceivers, update a primary HD map based on a received map update, determine one or more structural feature changes of the updated primary HD map that correspond to real-world structural changes represented in the primary HD map, based on a difference between the updated primary HD map and the primary HD map, and update a backup HD map by applying the one or more structural feature changes to the backup HD map. The one or more processors are configured to provide the updated primary HD map and the updated backup HD map for navigation.

An example apparatus for enhancing high-definition (HD) map reliability, the apparatus comprising means for receiving a map update wirelessly via at least one transceiver, means for updating a primary HD map based on a received map update, means for determining one or more structural feature changes of the updated primary HD map that correspond to real-world structural changes represented in the primary HD map, based on a difference between the updated primary HD map and the primary HD map, and means for updating a backup HD map by applying the one or more structural feature changes to the backup HD map. The apparatus further comprises means for providing the updated primary HD map and the updated backup HD map for navigation.

An example non-transitory computer-readable medium storing instructions for enhancing high-definition (HD) map reliability, the instructions comprising code for receiving a map update wirelessly via at least one transceiver, updating a map update to a primary HD map based on a received map update, determining one or more structural feature changes of the updated primary HD map that correspond to real-world structural changes represented in the primary HD map, based on a difference between the updated primary HD map and the primary HD map, and updating a backup HD map by applying the one or more structural feature changes to the backup HD map. The instructions further comprise code for providing the updated primary HD map and the updated backup HD map for navigation.

This summary is neither intended to identify key or essential features of the claimed subject matter nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

DETAILED DESCRIPTION

Figure 1:
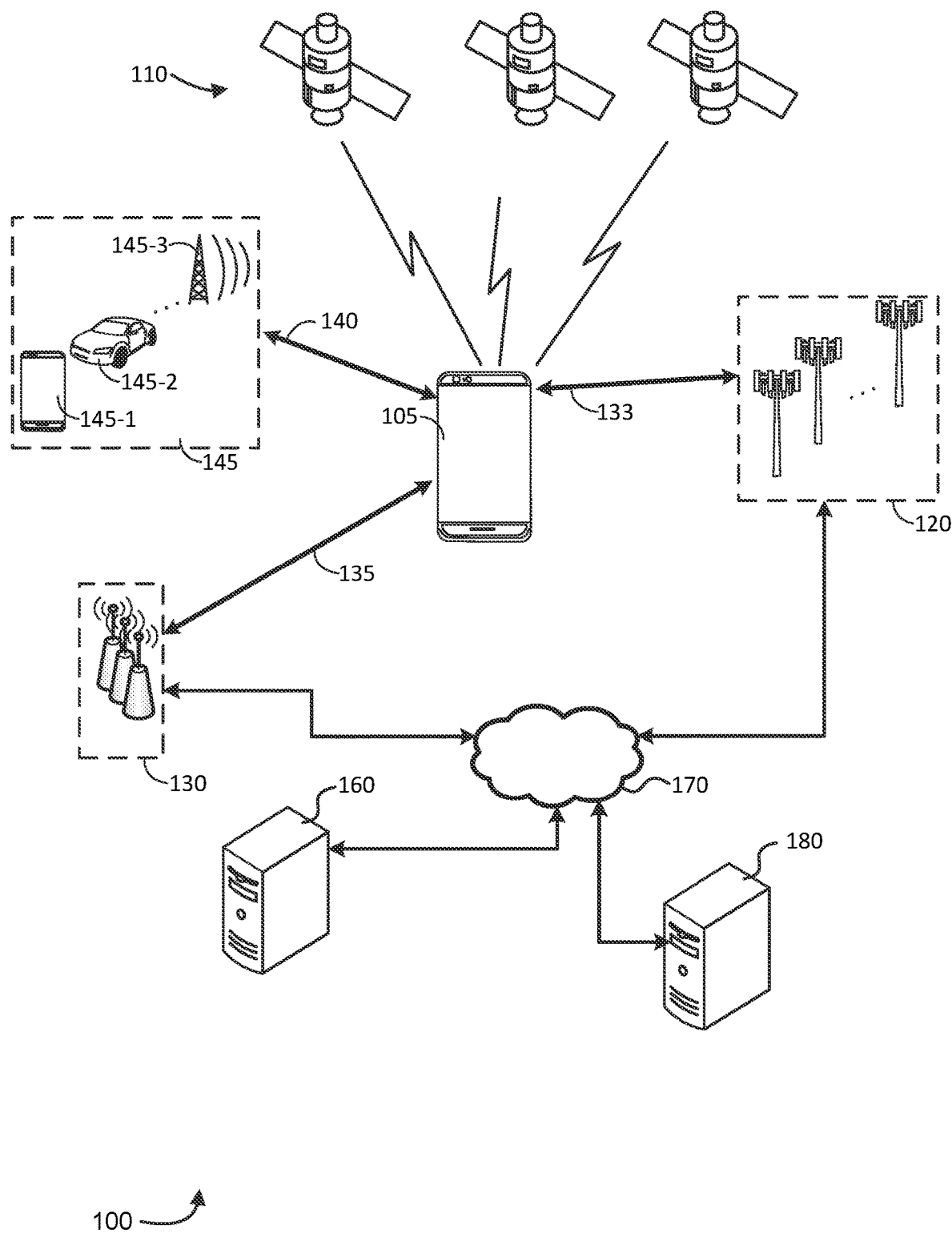
FIG. 1 is an illustration of a communication/positioning/sensing system, according to some embodiments.

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

As used herein, the terms "RF sensing," "passive RF sensing," and variants refer to a process by which one or more objects are detected using RF signals transmitted by a transmitting device and, after reflecting from the one or more objects, received by a receiving device. In a monostatic configuration, the transmitting and receiving device are the same device. In multi-static configuration, one or more receiving devices are separate from one or more transmitting devices. As described hereafter in more detail, a receiving device can make measurements of these reflected RF signals to determine one or more characteristics of the one or more objects, such as location, angle, direction, orientation, Doppler, velocity, etc. According to some embodiments, RF sensing may be "passive" in that no RF signals need to be transmitted by the receiving device or one or more objects for the one or more objects to be detected.

Additionally, unless otherwise specified, references to "sensing signals," "RF sensing signals," "reference signals," "sensing reference signals," "reference signals for sensing," and the like may be used to refer to signals used for sensing for a user equipment (UE). As described in more detail herein, such signals may comprise any of a variety of signal types but may not necessarily be limited to a Positioning Reference Signal (PRS) as defined in relevant wireless standards.

As used herein, the term "position estimate" of a vehicle is an estimation of the location of the vehicle within a frame of reference. This can mean, for example, an estimate of vehicle location on a 2D coordinate frame (e.g., latitude and longitude on a 2D map, etc.) or within a 3D coordinate frame (e.g., latitude, longitude, and altitude (LLA) on a 3D map), and may optionally include orientation information, such as heading. In some embodiments, a position estimate may include an estimate of six degrees of freedom (6-DOF) (also known as "pose"), which includes translation (latitude, longitude, and altitude) and orientation (pitch, roll, and yaw) information.

As used herein, the terms "map," "HD map," "map data," "HD map data," and derivatives thereof may refer to an electronic representation of a physical location or geographical area. As noted, map data may include different "layers" of different data types, such as radar, camera, etc. As a person of ordinary skill in the art will understand, this electronic representation may be stored in a database or other data structure (in any of a variety of storage mediums) as one or more electronic files, data objects, or the like.

It can be noted that, although determining the position of a vehicle are mentioned herein after, embodiments are not so limited. Alternative embodiments, for example, may be directed toward other mobile devices (e.g., mobile computing devices and/or UEs) and/or applications in which position determination is made. A person of ordinary skill in the art will recognize many variations to the embodiments described herein.

Various aspects generally relate to HD maps in vehicle systems. Some aspects more specifically relate to a method for enhancing HD map reliability performed by a UE (e.g., a mobile computing device). In some examples, the UE may periodically check for map updates and may download the map update if a map update is detected and/or available. The downloaded map update may be applied to a primary map (e.g., an in-use/working or to-be-used primary HD map) for updating. Responsive to updating the primary map being successful, the UE may determine one or more structural feature changes of the updated primary map that correspond to real-world structural changes represented in the primary map. In some embodiments, the one or more structural feature changes may be determined by accessing a difference between the updated primary map and the primary map. Responsive to a determination of the one or more structural feature changes, the map update may be considered as "significant," and the UE may update a secondary map (e.g., a backup HD map) by applying the "significant" map update (e.g., by applying the determined one or more structural feature changes, and additionally or alternatively, by incorporating the user-preferred routes or new routes) to the secondary map. Accordingly, the secondary map may be up-to-date and may reflect the latest available HD map data. In some examples, the updated primary map and the updated secondary map may be provided for navigation and/or for autonomous driving.

HD map data is typically received/downloaded from a server or cloud-based system, where a variety of sensors and data sources are utilized to collect and analyze information about the road network and traffic patterns. Using sophisticated processing techniques (e.g., sensor fusion algorithms), the HD map data may be combined with inputs from the sensors on a vehicle (e.g., radio frequency (RF) signals and camera images), resulting in a detailed and constantly updated map of the environment in real-time. By accessing this HD map data through a wireless network, such as cellular or satellite connections, autonomous vehicles may gain invaluable insights that inform their behavior and decision-making. For instance, the vehicle can leverage the HD map data to proactively navigate around road construction, bypass traffic congestion, and respond effectively to accidents. Moreover, when used for navigation, the HD map data enables the vehicle to optimize its route, prioritizing efficiency and safety.

A corrupted HD map may contain inaccurate or outdated data pertaining to road conditions, lane boundaries, traffic signs, and other critical details. Such inaccuracies can result in the autonomous vehicle perceiving and comprehending the environment incorrectly. When an HD map is corrupted, the autonomous vehicle may make erroneous navigation decisions, including incorrect lane changes, inaccurate turn instructions, inappropriate route planning, etc. Consequently, the safety and efficiency of the vehicle's operations may be compromised. As a result, the integrity of the HD map used in autonomous vehicles is of paramount importance, as any corruption in the map may lead to severe implications for the vehicle's navigation and decision-making capabilities.

In existing technical solutions, when the primary map used in autonomous vehicles corrupts, the system falls back to the secondary map as a precautionary measure designed to ensure that the vehicle can continue to navigate safely. The secondary map often includes outdated information that can introduce reliability issues and compromise safety. Particular aspects of the subject matter described in this disclosure can be implemented to maintain the integrity of the HD map and ensure the availability of up-to-date and accurate data in navigation and/or autonomous driving by dynamically applying "significant map update" to the secondary map. Therefore, when the primary map is corrupted, the secondary map can still provide up-to-date and accurate data for navigation and/or autonomous driving. The operation safety of autonomous vehicles may be enhanced as a result.

As will be discussed in detail below, a vehicle may be capable of determine a position of the vehicle (e.g., using a communication/positioning/sensing system) which could be used in conjunction with downloading and/or using HD map by the vehicle/vehicle system. For example, FIG. 1 is a simplified illustration of a wireless system capable of communication, positioning, and sensing, referred to herein as a "communication/positioning/sensing system" 100 in which a mobile device 105, network function server 160, and/or other components of the communication/positioning/sensing system 100 can use the techniques provided herein for RF sensing and/or positioning of a vehicle (e.g., with the communication/positioning/sensing system 100 being associated with the vehicle), according to an embodiment. (That said, embodiments are not necessarily limited to such a system.) The techniques described herein may be implemented by one or more components of the communication/positioning/sensing system 100. The communication/positioning/sensing system 100 can include: a mobile device 105; one or more satellites 110 (also referred to as space vehicles (SVs)), which may include Global Navigation Satellite System (GNSS) satellites (e.g., satellites of the Global Positioning System (GPS), GLONASS, Galileo, Beidou, etc.) and or Non-Terrestrial Network (NTN) satellites; base stations 120; access points (APs) 130; network function server 160; network 170; and external client 180. Generally put, the communication/positioning/sensing system 100 may be capable of enabling communication between the mobile device 105 and other devices, positioning of the mobile device 105 and/or other devices, performing RF sensing by the mobile device 105 and/or other devices, or a combination thereof. For example, the communication/positioning/sensing system 100 can estimate a location of the mobile device 105 based on RF signals received by and/or sent from the mobile device 105 and known locations of other components (e.g., GNSS satellites 110, base stations 120, APs 130) transmitting and/or receiving the RF signals. Additionally or alternatively, wireless devices such as the mobile device 105, base stations 120, and satellites 110 (and/or other NTN platforms) can be utilized to perform positioning (e.g., of one or more wireless devices) and/or perform RF sensing (e.g., of one or more objects by using RF signals transmitted by one or more wireless devices). The mobile device 105 (also referred to as UE 105 herein) may be referred to as a wireless communication device, a mobile terminal, a terminal, a mobile station (MS), a Secure User Plane Location (SUPL)-Enabled Terminal (SET), or by some other name. Moreover, mobile device 105 or UE 105 may correspond to a cellphone, smartphone, laptop, tablet, personal data assistant (PDA), navigation device, wearable device, Internet of Things (IoT) device, or some other portable or moveable device. In various embodiments and implementations, the mobile device 105 (UE 105) and/or other mobile devices/UEs discussed herein (e.g., UE 205, UE 145, etc.) may also refer to a vehicle, a vehicle system, a vehicle component, or a computing device associated with the vehicle.

It should be noted that FIG. 1 provides only a generalized illustration of various components, any or all of which may be utilized as appropriate, and each of which may be duplicated as necessary. Specifically, although only one mobile device 105 is illustrated, it will be understood that many UEs (e.g., hundreds, thousands, millions, etc.) may utilize the communication/positioning/sensing system 100. Similarly, the communication/positioning/sensing system 100 may include a larger or smaller number of base stations 120 and/or APs 130 than illustrated in FIG. 1. The illustrated connections that connect the various components in the communication/positioning/sensing system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to network function server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). In and LTE, 5G, or other cellular network, mobile device 105 may be referred to as a user equipment (UE). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUS), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, mobile device 105 can send and receive information with network-connected devices, such as network function server 160, by accessing the network 170 via a base station 120 using a first communication link 133. Additionally or alternatively, because APs 130 also may be communicatively coupled with the network 170, mobile device 105 may communicate with network-connected and Internet-connected devices, including network function server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). According to aspects of applicable 5G cellular standards, a base station 120 (e.g., gNB) may be capable of transmitting different "beams" in different directions and performing "beam sweeping" in which a signal is transmitted in different beams, along different directions (e.g., one after the other). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

Satellites 110 may be utilized for positioning in communication in one or more way. For example, satellites 110 (also referred to as space vehicles (SVs)) may be part of a Global Navigation Satellite System (GNSS) such as the Global Positioning System (GPS), GLONASS, Galileo or Beidou. Positioning using RF signals from GNSS satellites may comprise measuring multiple GNSS signals at a GNSS receiver of the mobile device 105 to perform code-based and/or carrier-based positioning, which can be highly accurate. Additionally or alternatively, satellites 110 may be utilized for NTN-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120 and may be coordinated by a network function server 160, which may operate as a location server. In some embodiments, satellites 110 used for NTN-based positioning may be different than those used for GNSS-based positioning. In some embodiments NTN nodes may include non-terrestrial vehicles which may be in addition or as an alternative to NTN satellites. NTN satellites 110 and/or other NTN platforms may be further leveraged to perform RF sensing. As described in more detail hereafter, satellites may use a JCS symbol in an Orthogonal Frequency-Division Multiplexing (OFDM) waveform to allow both RF sensing and/or positioning, and communication.

The network function server 160 may comprise one or more servers and/or other computing devices configured to provide a network-managed and/or network-assisted function, such as operating as a location server and/or sensing server. A location server, for example, may determine an estimated location of mobile device 105 and/or provide data (e.g., "assistance data") to mobile device 105 to facilitate location measurement and/or location determination by mobile device 105. According to some embodiments, a location server may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in the location server. In some embodiments, the location server may comprise, a Discovered SLP (D-SLP) or an Emergency SLP (E-SLP). The location server may also comprise an Enhanced Serving Mobile Location Center (E-SMLC) that supports location of mobile device 105 using a control plane (CP) location solution for LTE radio access by mobile device 105. The location server may further comprise a Location Management Function (LMF) that supports location of mobile device 105 using a control plane (CP) location solution for NR or LTE radio access by mobile device 105.

Similarly, the network function server 160, may function as a sensing server. A sensing server can be used to coordinate and/or assist in the coordination of sensing of one or more objects (also referred to herein as "targets") by one or more wireless devices in the communication/positioning/sensing system 100. This can include the mobile device 105, base stations 120, APs 130, other mobile devices 145, satellites 110, or any combination thereof. Wireless devices capable of performing RF sensing may be referred to herein as "sensing nodes." To perform RF sensing, a sensing server may coordinate sensing sessions in which one or more RF sensing nodes may perform RF sensing by transmitting RF signals (e.g., reference signals (RSs)), and measuring reflected signals, or "echoes," comprising reflections of the transmitted RF signals off of one or more objects/targets. Reflected signals and object/target detection may be determined, for example, from channel state information (CSI) received at a receiving device. Sensing may comprise (i) monostatic sensing using a single device as a transmitter (of RF signals) and receiver (of reflected signals); (ii) bistatic sensing using a first device as a transmitter and a second device as a receiver; or (iii) multi-static sensing using a plurality of transmitters and/or a plurality of receivers. To facilitate sensing (e.g., in a sensing session among one or more sensing nodes), a sensing server may provide data (e.g., "assistance data") to the sensing nodes to facilitate RS transmission and/or measurement, object/target detection, or any combination thereof. Such data may include an RS configuration indicating which resources (e.g., time and/or frequency resources) may be used (e.g., in a sensing session) to transmit RS for RF sensing. According to some embodiments, a sensing server may comprise a Sensing Management Function (SMF).

Although terrestrial components such as APs 130 and base stations 120 may be fixed, embodiments are not so limited. Mobile components may be used. For example, in some embodiments, a location of the mobile device 105 may be estimated at least in part based on measurements of RF signals 140 communicated between the mobile device 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the mobile device 105, or a combination thereof. Wireless signals from mobile devices 145 used for positioning of the mobile device 105 may comprise RF signals using, for example, Bluetooth® (including Bluetooth Low Energy (BLE)), IEEE 802.11x (e.g., Wi-Fi®), Ultra Wideband (UWB), IEEE 802.15x, or a combination thereof. Mobile devices 145 may additionally or alternatively use non-RF wireless signals for positioning of the mobile device 105, such as infrared signals or other optical technologies.

An estimated location of mobile device 105 can be used in a variety of applications—e.g., to assist direction finding or navigation for a user of mobile device 105 or to assist another user (e.g., associated with external client 180) to locate mobile device 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of mobile device 105 may comprise an absolute location of mobile device 105 (e.g. a latitude and longitude and possibly altitude) or a relative location of mobile device 105 (e.g. a location expressed as distances north or south, east or west and possibly above or below some other known fixed location (including, e.g., the location of a base station 120 or AP 130) or some other location such as a location for mobile device 105 at some known previous time, or a location of a mobile device 145 (e.g., another UE) at some known previous time). A location may be specified as a geodetic location comprising coordinates which may be absolute (e.g., latitude, longitude and optionally altitude), relative (e.g., relative to some known absolute location) or local (e.g., X, Y and optionally Z coordinates according to a coordinate system defined relative to a local area such a factory, warehouse, college campus, shopping mall, sports stadium or convention center). A location may instead be a civic location and may then comprise one or more of a street address (e.g., including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g., a circle or ellipse) within which mobile device 105 is expected to be located with some level of confidence (e.g., 95% confidence).

The external client 180 may be a web server or remote application that may have some association with mobile device 105 (e.g., may be accessed by a user of mobile device 105) or may be a server, application, or computer system providing a location service to some other user or users which may include obtaining and providing the location of mobile device 105 (e.g., to enable a service such as friend or relative finder, or child or pet location). Additionally or alternatively, the external client 180 may obtain and provide the location of mobile device 105 to an emergency services provider, government agency, etc.

Figure 2:
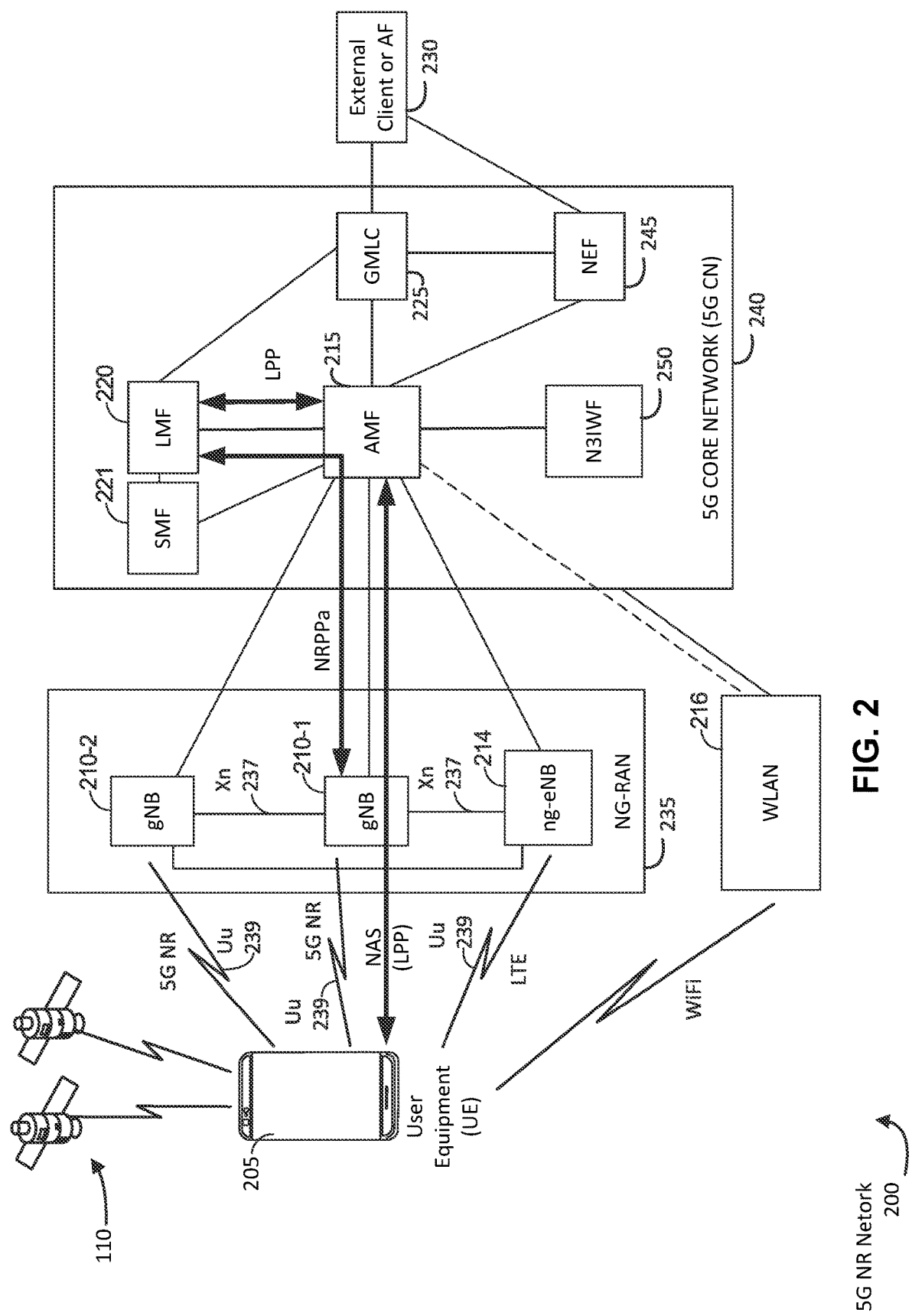
FIG. 2 shows a diagram of a 5G NR network, illustrating an embodiment of a wireless system (e.g., the communication/positioning/sensing system shown in FIG. 1) implemented in 5G NR.

As previously noted, the example communication/positioning/sensing system 100 can be implemented using a wireless communication network, such as an LTE-based or 5G NR-based network, or a future 6G network. FIG. 2 shows a diagram of a 5G NR network 200, illustrating an embodiment of a wireless system (e.g., communication/positioning/sensing system 100) implemented in 5G NR. The 5G NR network 200 may be configured to enable wireless communication, determine the location of a UE 205 (which may correspond to the mobile device 105 of FIG. 1), perform RF sensing, or a combination thereof, by using access nodes, which may include NR NodeB (gNB) 210-1 and 210-2 (collectively and generically referred to herein as gNBs 210), ng-eNB 214, and/or WLAN 216. These access nodes can use RF signaling to enable the communication, implement one or more positioning methods, and/or implement RF sensing. The gNBs 210 and/or the ng-eNB 214 may correspond with base stations 120 of FIG. 1, and the WLAN 216 may correspond with one or more access points 130 of FIG. 1. Optionally, the 5G NR network 200 additionally may be configured to determine the location of a UE 205 by using an LMF 220 (which may correspond with location server 160) to implement the one or more positioning methods. The SMF 221 may coordinate RF sensing by the 5G NR network 200. Here, the 5G NR network 200 comprises a UE 205, and components of a 5G NR network comprising a Next Generation (NG) Radio Access Network (RAN) (NG-RAN) 235 and a 5G Core Network (5G CN) 240. A 5G NR network 200 may also be called a 5G network and/or an NR network; NG-RAN 235 may be referred to as a 5G RAN or as an NR RAN; and 5G CN 240 may be referred to as an NG Core network. Additional components of the 5G NR network 200 are described below. The 5G NR network 200 may include additional or alternative components.

The 5G NR network 200 may further utilize information from satellites 110. As previously indicated, satellites 110 may comprise GNSS satellites from a GNSS system like Global Positioning System (GPS) or similar system (e.g. GLONASS, Galileo, Beidou, Indian Regional Navigational Satellite System (IRNSS)). Additionally or alternatively, satellites 110 may comprise NTN satellites that may be communicatively coupled with the LMF 220 and may operatively function as a TRP (or TP) in the NG-RAN 235. As such, satellites 110 may be in communication with one or more gNB 210.

It should be noted that FIG. 2 provides only a generalized illustration of various components, any or all of which may be utilized as appropriate, and each of which may be duplicated or omitted as necessary. Specifically, although only one UE 205 is illustrated, it will be understood that many UEs (e.g., hundreds, thousands, millions, etc.) may utilize the 5G NR network 200. Similarly, the 5G NR network 200 may include a larger (or smaller) number of satellites 110, gNBs 210, ng-eNBs 214, Wireless Local Area Networks (WLANs) 216, Access and mobility Management Functions (AMF) s 215, external clients 230, and/or other components. The illustrated connections that connect the various components in the 5G NR network 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 205 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 205 may correspond to a cellphone, smartphone, laptop, tablet, personal data assistant (PDA), navigation device, wearable device, Internet of Things (IoT) device, or some other portable or moveable device. In various embodiments and implementations, the UE 205 and/or other UEs discussed herein (e.g., UE 105, UE 145, etc.) may also refer to a vehicle, a vehicle system, a vehicle component, or a computing device associated with the vehicle. Typically, though not necessarily, the UE 205 may support wireless communication using one or more Radio Access Technologies (RATs) such as using GSM, CDMA, W-CDMA, LTE, High-Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 205 may also support wireless communication using a WLAN 216 which (like the one or more RATs, and as previously noted with respect to FIG. 1) may connect to other networks, such as the Internet. The use of one or more of these RATs may allow the UE 205 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 205 (e.g., via the GMLC 225). The external client 230 of FIG. 2 may correspond to external client 180 of FIG. 1, as implemented in or communicatively coupled with a 5G NR network.

The UE 205 may include a single entity or may include multiple entities, such as in a personal area network where a user may employ audio, video and/or data I/O devices, and/or body sensors and a separate wireline or wireless modem. An estimate of a location of the UE 205 may be referred to as a location, location estimate, location fix, fix, position, position estimate, or position fix, and may be geodetic, thus providing location coordinates for the UE 205 (e.g., latitude and longitude), which may or may not include an altitude component (e.g., height above sea level, height above or depth below ground level, floor level or basement level). Alternatively, a location of the UE 205 may be expressed as a civic location (e.g., as a postal address or the designation of some point or small area in a building, such as a particular room or floor). A location of the UE 205 may also be expressed as an area or volume (defined either geodetically or in civic form) within which the UE 205 is expected to be located with some probability or confidence level (e.g., 67%, 95%, etc.). A location of the UE 205 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g., for latitude, longitude, and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 205 via wireless communication between the UE 205 and one or more of the gNBs 210, which may provide wireless communications access to the 5G CN 240 on behalf of the UE 205 using 5G NR. The wireless interface between base stations (gNBs 210 and/or ng-eNB 214) and the UE 205 may be referred to as a Uu interface 239. 5G NR radio access may also be referred to as NR radio access or as 5G radio access. In FIG. 2, the serving gNB for UE 205 is assumed to be gNB 210-1, although other gNBs (e.g., gNB 210-2) may act as a serving gNB if UE 205 moves to another location or may act as a secondary gNB to provide additional throughput and bandwidth to UE 205.

Base stations in the NG-RAN 235 shown in FIG. 2 may also or instead include a next-generation evolved Node B, also referred to as an ng-eNB, 214. Ng-eNB 214 may be connected to one or more gNBs 210 in NG-RAN 235—e.g., directly or indirectly via other gNBs 210 and/or other ng-eNBs. An ng-eNB 214 may provide LTE wireless access and/or evolved LTE (eLTE) wireless access to UE 205. Some gNBs 210 (e.g., gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 205 but may not receive signals from UE 205 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 205. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR network 200, such as the LMF 220 and AMF 215.

5G NR network 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 205 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 205 to other elements in 5G CN 240 and/or may support interworking of one or more protocols used by WLAN 216 and UE 205 to one or more protocols used by other elements of 5G CN 240 such as AMF 215. For example, N3IWF 250 may support IPSec tunnel establishment with UE 205, termination of IKEv2/IPSec protocols with UE 205, termination of N2 and N3 interfaces to 5G CN 240 for control plane and user plane, respectively, relaying of uplink (UL) and downlink (DL) control plane Non-Access Stratum (NAS) signaling between UE 205 and AMF 215 across an N1 interface. In some other embodiments, WLAN 216 may connect directly to elements in 5G CN 240 (e.g., AMF 215 as shown by the dashed line in FIG. 2) and not via N3IWF 250. For example, a direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 205 and the AMF 215. As noted, this can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR network 200), may be configured to, in response to receiving a request for location information from the LMF 220, obtain location measurements of uplink (UL) signals received from the UE 205) and/or obtain downlink (DL) location measurements from the UE 205 that were obtained by UE 205 for DL signals received by UE 205 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 205, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 205 may be applicable to such other networks.

The gNBs 210 and ng-eNB 214 can communicate with an AMF 215, which, for positioning functionality, communicates with an LMF 220. The AMF 215 may support mobility of the UE 205, including cell change and handover of UE 205 from an access node (e.g., gNB 210, ng-eNB 214, or WLAN 216) of a first RAT to an access node of a second RAT. The AMF 215 may also participate in supporting a signaling connection to the UE 205 and possibly data and voice bearers for the UE 205. The LMF 220 may support positioning of the UE 205 using a CP location solution when UE 205 accesses the NG-RAN 235 or WLAN 216 and may support position procedures and methods, including UE assisted/UE based and/or network-based procedures/methods, such as Assisted GNSS (A-GNSS), Observed Time Difference Of Arrival (OTDOA) (which may be referred to in NR as Time Difference Of Arrival (TDOA)), Frequency Difference Of Arrival (FDOA), Real Time Kinematic (RTK), Precise Point Positioning (PPP), Differential GNSS (DGNSS), Enhanced Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 205, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 205's location) may be performed at the UE 205 (e.g., by measuring downlink PRS (DL-PRS) signals transmitted by wireless nodes such as gNBs 210, ng-eNB 214 and/or WLAN 216, and/or using assistance data provided to the UE 205, e.g., by LMF 220).

The Gateway Mobile Location Center (GMLC) 225 may support a location request for the UE 205 received from an external client 230 and may forward such a location request to the AMF 215 for forwarding by the AMF 215 to the LMF 220. A location response from the LMF 220 (e.g., containing a location estimate for the UE 205) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 205 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g., a civic location) of UE 205 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 205 may communicate using an LTE Positioning Protocol (LPP) as defined in 3GPP TS 37.355. Here, LPP messages may be transferred between the UE 205 and the LMF 220 via the AMF 215 and a serving gNB 210-1 or serving ng-eNB 214 for UE 205. For example, LPP messages may be transferred between the LMF 220 and the AMF 215 using messages for service-based operations (e.g., based on the Hypertext Transfer Protocol (HTTP)) and may be transferred between the AMF 215 and the UE 205 using a 5G NAS protocol. The LPP protocol may be used to support positioning of UE 205 using UE assisted and/or UE based position methods such as A-GNSS, RTK, TDOA, multi-cell RTT, AoD, and/or ECID. The NRPPa protocol may be used to support positioning of UE 205 using network-based position methods such as ECID, AoA, uplink TDOA (UL-TDOA) and/or may be used by LMF 220 to obtain location-related information from gNBs 210 and/or ng-eNB 214, such as parameters defining DL-PRS transmission from gNBs 210 and/or ng-eNB 214.

In the case of UE 205 access to WLAN 216, LMF 220 may use NRPPa and/or LPP to obtain a location of UE 205 in a similar manner to that just described for UE 205 access to a gNB 210 or ng-eNB 214. Thus, NRPPa messages may be transferred between a WLAN 216 and the LMF 220, via the AMF 215 and N3IWF 250 to support network-based positioning of UE 205 and/or transfer of other location information from WLAN 216 to LMF 220. Alternatively, NRPPa messages may be transferred between N3IWF 250 and the LMF 220, via the AMF 215, to support network-based positioning of UE 205 based on location-related information and/or location measurements known to or accessible to N3IWF 250 and transferred from N3IWF 250 to LMF 220 using NRPPa. Similarly, LPP and/or LPP messages may be transferred between the UE 205 and the LMF 220 via the AMF 215, N3IWF 250, and serving WLAN 216 for UE 205 to support UE assisted or UE based positioning of UE 205 by LMF 220.

As mentioned above, cellular networks such as 5G NR cellular networks and/or satellite networks can be used to communicate (e.g., download) HD map data for navigation and/or autonomous driving.

Figure 3:
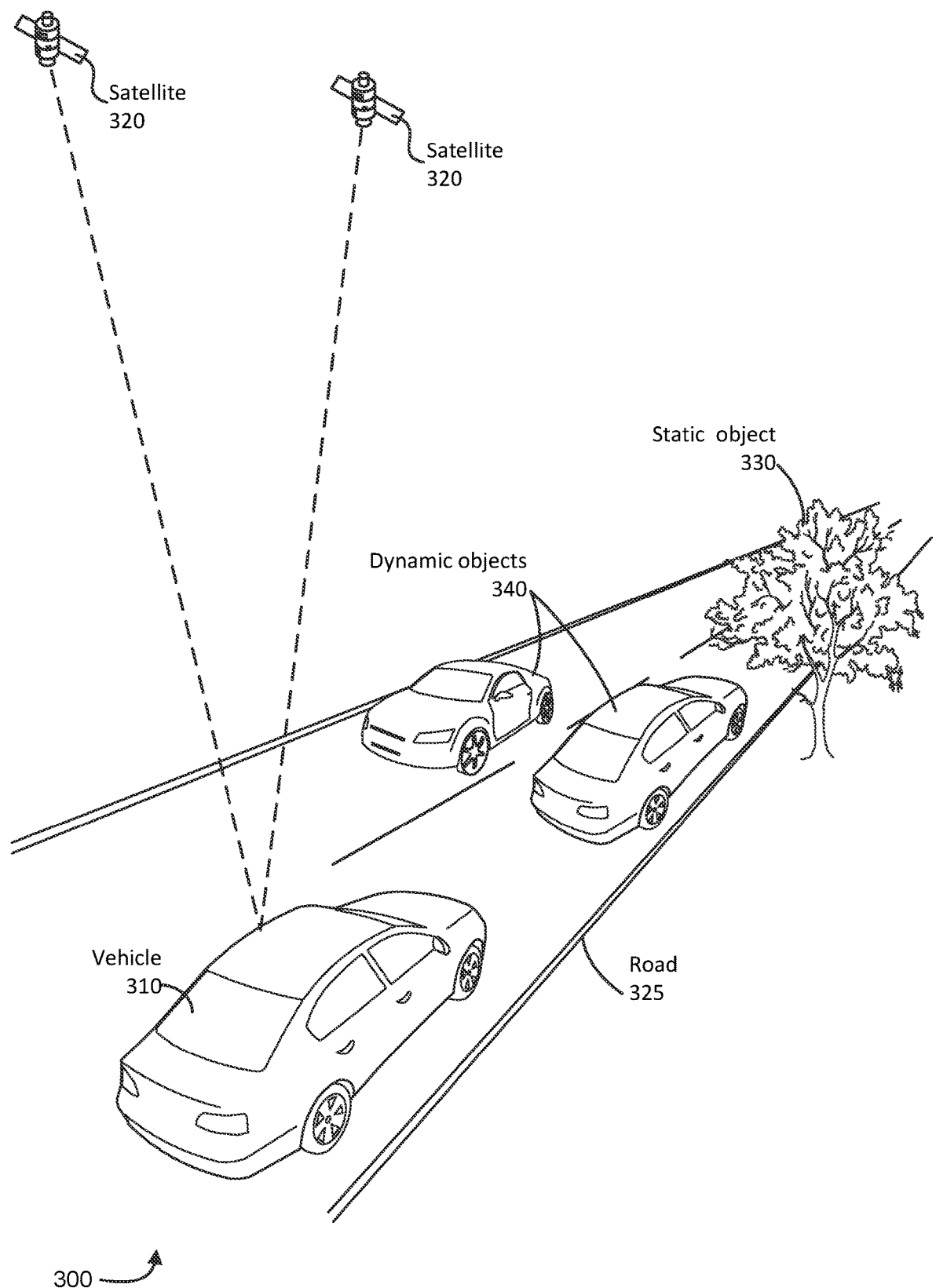
FIG. 3 is a drawing of a perspective view of a vehicle.

FIG. 3 shows a perspective view 300 of a vehicle 310, illustrating a method by which the vehicle 310 (e.g., a mobile computing system on the vehicle 310, such as a UE) might download map data and/or map updates, according to certain embodiments. In some embodiments, the vehicle 310 may first determine its position (e.g., using the system discussed with respect to FIG. 1) and then request the download of map data and/or updates corresponding to the determined position. For instance, the vehicle 310 may request map data or updates related to areas within a predetermined radius of the determined position of the vehicle 310 or within a predetermined range of distances along the anticipated route of the vehicle 310. In other words, HD map of a particular region may be downloaded by the vehicle 310 from a server, for example, when the vehicle 310 approaches or enters the region.

It is understood that while the map data and/or updates may be downloaded based on a position estimate of the vehicle, the embodiments are not so limited. In some embodiments, the map data and/or updates also be downloaded/installed independent of the current position of the vehicle 310. For example, the map data and/or updates may be downloaded based on user's selection(s) (e.g., a user of the navigation application or the autonomous vehicle) related to, e.g., areas of a forthcoming trip. Additionally or alternatively, the vehicle 310 may periodically check/detect for available map updates for existing (e.g., already downloaded, installed, and stored in any of a variety of suitable storage mediums) HD maps.

In some embodiments, positioning of the vehicle 310 may be performed using a GNSS receiver at the vehicle 310 to receive radio frequency (RF) signals transmitted by GNSS satellites 320. (Of course, although satellites 320 in FIG. 3 are illustrated as relatively close to the vehicle 310 for visual simplicity, it will be understood that satellites 320 will be in orbit around the earth. Moreover, the satellites 320 may be part of a large constellation of satellites of a GNSS system. Additional satellites of such a constellation are not shown in FIG. 3.) GNSS satellites 320 may correspond to satellites 110 in FIG. 1 or 2. Additionally or alternatively, the terrestrial positioning may be performed using RF signals from terrestrial beacons are transceivers, such as base stations from a cellular communication network. Vehicle sensors and in HD map may also be used to help determine an accurate position of the vehicle 310. (Additional details regarding how these different components can be used for positioning are provided with regard to FIG. 4.) The position of the vehicle 310 may be used for purposes other than mapping, such as vehicle maneuvering, navigation, and so forth.

Figure 4:
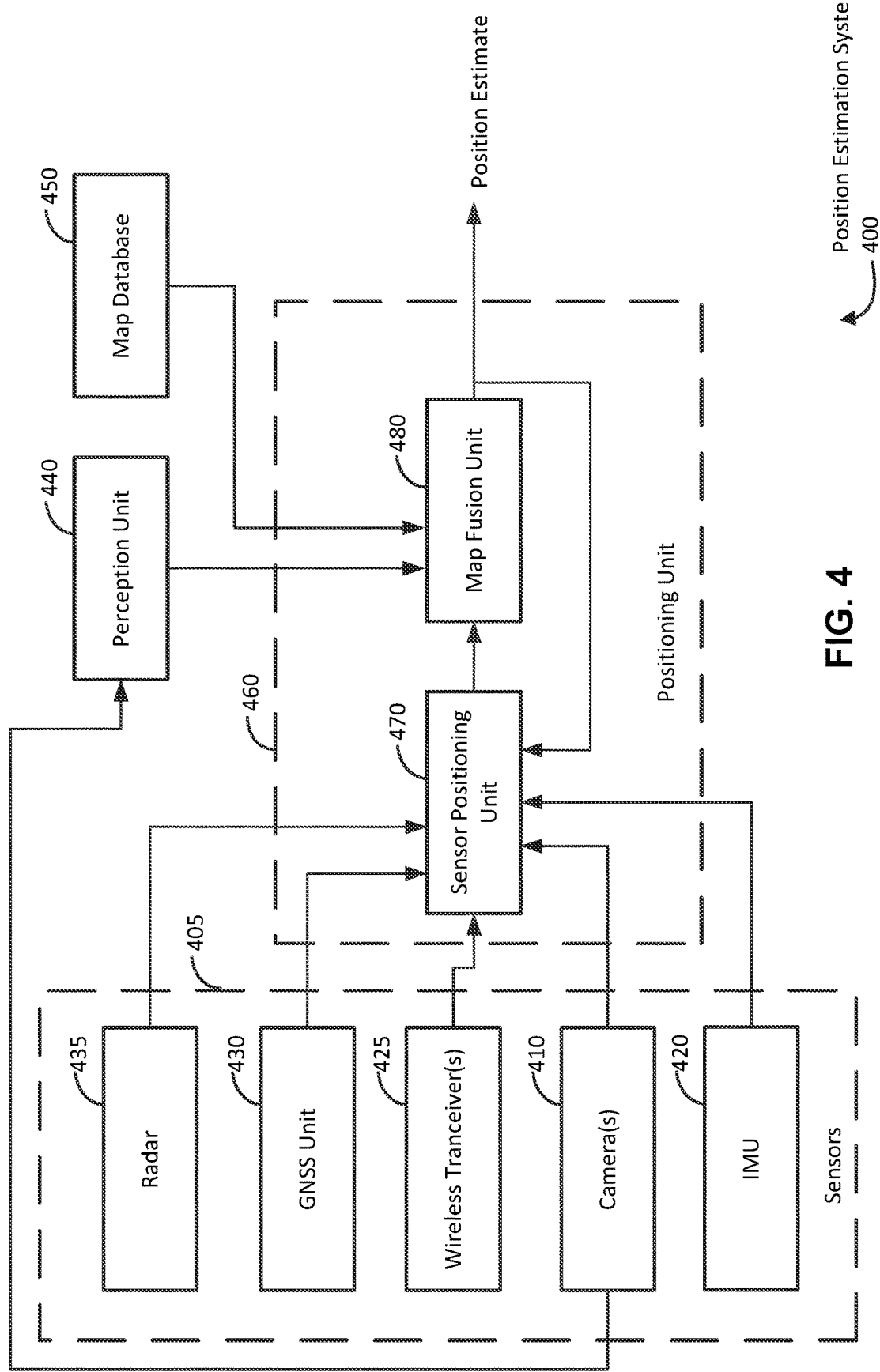
FIG. 4 is a block diagram of a position estimation system, providing an example of a vehicle system that may use an HD map, according to some embodiments.

FIG. 4 is a block diagram of a position estimation system 400, providing an example of a vehicle system that may use an HD map, according to an embodiment. The position estimation system 400 collects data from various different sources and outputs a position estimate of the vehicle. This position estimate can be used by an automated driving system, ADAS system, and/or other systems on the vehicle, as well as systems (e.g., traffic monitoring systems) remote to the vehicle. Additionally, as noted, the position estimate of the vehicle can be used by a mapping system of the vehicle when performing the techniques for mapping described hereafter. The position estimation system 400 comprises sensors 405, including one or more cameras 410, an inertial measurement unit (IMU) 420, a GNSS unit 430, and radar 435. The position estimation system 400 further comprises a perception unit 440, a map database 450, and a positioning unit 460 comprising a sensor positioning unit 470 and a map fusion unit 480. In alternative embodiments, the components illustrated in FIG. 4 may be combined, separated, omitted, rearranged, and/or otherwise altered, depending on desired functionality. Moreover, in alternative embodiments, position estimation may be determined using additional or alternative data and/or data sources. For example, sensors 405 may include one or more additional or alternative sensors (e.g., lidar, sonar, etc.). One or more components of the position estimation system 400 may be implemented in hardware and/or software, such as one or more hardware and/or software components of the mobile computing system 700 illustrated in FIG. 7 and described in more detail below. For example, the positioning unit 460 may be implemented by one or more processing units. The various hardware and/or software components that implement the positioning estimation system 400 may be distributed at various different locations on a vehicle, depending on desired functionality.

Wireless transceiver(s) 425 may comprise one or more RF transceivers (e.g., Wi-Fi transceiver, Wireless Wide Area Network (WWAN) or cellular transceiver, Bluetooth transceiver, etc.) for receiving positioning data from various terrestrial positioning data sources. These terrestrial positioning data sources may include, for example, Wi-Fi Access Points (APs) (Wi-Fi signals including Dedicated Source Range Communications (DSRC) signals), cellular base stations (e.g., cellular-based signals such as Positioning Reference Signals (PRS) or signals communicated via Vehicle-to-Everything (V2X), cellular V2X (CV2X), or Long-Term Evolution (LTE) direct protocols, etc.), and/or other positioning sources such as roadside units (RSUs), etc. Wireless transceiver(s) 425 also may be used for wireless communication (e.g., via Wi-Fi, cellular, etc.), in which case wireless transceivers 425 may be incorporated into a wireless communication interface of the vehicle.

The GNSS unit 430 may comprise a GNSS receiver and GNSS processing circuitry configured to receive signals from GNSS satellites (e.g., satellites 110 and/or 320) and GNSS-based positioning data. The positioning data output by the GNSS unit 430 can vary, depending on desired functionality. In some embodiments, the GNSS unit 430 may provide, among other things, a three-degrees-of-freedom (3-DOF) position determination (e.g., latitude, longitude, and altitude). Additionally or alternatively, the GNSS unit 430 can output the underlying satellite measurements used to make the 3-DOF position determination. Additionally, or alternatively, the GNSS unit can output raw measurements, such as pseudo-range and carrier-phase measurements.

The camera(s) 410 may comprise one or more cameras disposed on or in the vehicle, configured to capture images, from the perspective of the vehicle, to help track movement of the vehicle. The camera(s) 410 may be front-facing, upward-facing, backward-facing, downward-facing, and/or otherwise positioned on the vehicle. Other aspects of the camera(s) 410, such as resolution, optical band (e.g., visible light, infrared (IR), etc.), frame rate (e.g., 30 frames per second (FPS)), and the like, may be determined based on desired functionality. Movement of the vehicle 310 may be tracked from images captured by the camera(s) 410 using various image processing techniques to determine motion blur, object tracking, and the like. The raw images and/or information resulting therefrom may be passed to the sensor positioning unit 470, which may perform visual inertial odometry (VIO) using the data from both the camera(s) 410 and the IMU 420.

IMU 420 may comprise one or more accelerometers, gyroscopes, and/or (optionally) other sensors, such as magnetometers, to provide inertial measurements. Similar to the camera(s) 410, the output of the IMU 420 to the sensor positioning unit 470 may vary, depending on desired functionality. In some embodiments, the output of the IMU 420 may comprise information indicative of a 3-DOF position or 6-DOF pose of the vehicle 310, and/or a 6-DOF linear and angular velocities of the vehicle 310, and may be provided periodically, based on a schedule, and/or in response to a triggering event. The position information may be relative to an initial or reference position. Alternatively, the IMU 420 may provide raw sensor measurements.

The radar 435 may comprise one or more radar sensors disposed in or on the vehicle. Similar to the camera(s) 410, radar may be front-facing, upward-facing, backward-facing, downward-facing, and/or otherwise positioned on the vehicle to gather information regarding the vehicle's surroundings. According to some embodiments, a radar may scan an area or volume near the vehicle at a rate of once every second or more, or several times per second (e.g., 5, 10, 20, 50, or 100 times per second, for example), and this scan rate may be dynamic, depending on sensor capability, processing capabilities, traffic conditions, etc. Radar scans may also be referred to herein as "frames." Radar can complement other sensors to help provide robust autonomous features. For example, enabling autonomous driving in true sense may require robust solutions for localization in all types of weather and environmental conditions, such that a vehicle knows its pose within few centimeters. Just like human eye, lidar and camera cannot see during night times or when there is too much fog in the surroundings. Global positioning sensors like GNSS may not be available in underground, or tunnel scenarios and may be challenged in urban canyon scenarios. In some embodiments, radar sensors may utilize lower frequencies, for instance using millimeter wave (mmWave) radar (e.g., having frequencies in the range of 30 GHz-300 GHz), for enabling sub-meter-level accuracy localization in such challenging scenarios.

The sensor positioning unit 470 may comprise a module (implemented in software and/or hardware) that is configured to fuse data from the sensors 405 to determine a position of the vehicle. As noted, the sensor positioning unit 470 may perform VIO by combining data received from the camera(s) 410 and IMU 420. The sensor positioning unit 470 may utilize data from the GNSS unit 430, radar 435, and/or wireless transceiver(s) 425 in addition or as an alternative to VIO data to determine a position of the vehicle and/or modify a determined position of the vehicle. In some embodiments, data from different sensors may be given different weights based on input type, a confidence metric (or other indication of the reliability of the input), and the like. Generally put, sensor positioning unit 470 may output an estimated position of the vehicle based on received inputs. Depending on the accuracy of the received inputs (e.g., accuracy of the data from the sensors 405, the output of the sensor positioning unit 470 may comprise highly-accurate vehicle position estimate in a global frame (or other reference frame) to the map fusion unit 480.

The map fusion unit 480 works to provide a vehicle position estimate within a map frame, based on the position estimate from the sensor positioning unit 470, as well as information from a map database 450 and a perception unit 440. The map database 450 can provide a 3D map (e.g., a high definition (HD) map in the form of one or more electronic files, data objects, etc.) of an area in which the vehicle 310 is located, and the perception unit 440 can make observations of lane markings, traffic signs, and/or other visual features in the vehicle's surroundings. To do so, the perception unit 440 may comprise a feature-extraction engine that performs image processing and computer vision on images received from the camera(s) 410. In some embodiments, the perception unit 440 may further operate using input from radar 435 and/or other sensors (e.g., lidar).

As previously noted, the position estimate provided by the map fusion unit 480 (i.e., the output of the positioning unit 460) may serve any of a variety of functions, depending on desired functionality. For example, it may be provided to autonomous driving, ADAS, and/or other systems of the vehicle 310 (and may be conveyed via a controller area network (CAN) bus), communicated to devices separate from the vehicle 310 (including other vehicles; servers maintained by government agencies, service providers, and the like; etc.), shown on a display of the vehicle (e.g., to a driver or other user for navigation or other purposes), and the like. The position estimate of the vehicle may additionally be used by the vehicle to perform download of map data/updates according to embodiments herein.

As stated above, HD maps are typically generated based on combining and analyzing information about the road network and traffic patterns, which is collected using a variety of sensors and data sources (e.g., one or more units and/or components described with respect to FIG. 4). Using sophisticated processing techniques, the HD map data may be combined with inputs from the sensors on a vehicle, resulting in a detailed and constantly updated map of the environment in real-time. For example, referring again to FIG. 3, as the vehicle 310 travels within a geographical region corresponding to an area of the HD map, the vehicle 310 may use different sensors (e.g., sensors 405) to gather information for different corresponding map layers of the HD map. For example, one or more cameras (e.g., camera(s) 410) can be used to gather information for a camera map layer, radar (e.g., radar 435) can be used to gather information for a radar map layer, layer may be used to gather information for a lidar map layer, and so forth. Map data (e.g., map layer information) may not only be gathered regarding a road 325 on which the vehicle 310 is traveling (e.g., lane boundary information, road curvature, road hazards, etc.) but also static objects 330 in or near the road 325. (Although the static object in FIG. 3 is illustrated as a tree, other static objects may comprise traffic signs, sidewalks, traffic lights, mile markers, etc.) In some embodiments, map data may also filter out dynamic objects 340. Dynamic objects may generally include moving objects such as other vehicles, pedestrians, bicyclists, etc.

When used for navigation and/or autonomous driving, HD map data is typically received/downloaded from a server or cloud-based system. By accessing this HD map data through a wireless network, such as cellular or satellite connections (e.g., the communication/positioning/sensing system in FIG. 1 or 2), autonomous vehicles may gain invaluable insights that inform their behavior and decision-making.

As discussed above, when a primary map (e.g., an primary HD map downloaded and/or installed) is corrupted (to be discussed in detail below), the system may fall back to a secondary map (e.g., the backup map) as a precautionary measure. Compared to the primary map, the secondary map may include a lower level of detail, be updated at a lower frequency, and be stored in a less accessible but more permanent location (thus, less susceptible to data corruption). As a result, in existing technical solutions, the secondary map may often include outdated information that can cause reliability issues and compromise safety when being relied upon (e.g., when the primary map is corrupted).

The technical solution disclosed herein can be implemented to maintain the reliability of the HD map and ensure the availability of up-to-date and accurate data in navigation and/or autonomous driving by determining and applying "significant map update(s)" to the secondary map. Therefore, when the secondary map is relied upon (e.g., the primary map is corrupted), the secondary map can still provide up-to-date and accurate data for navigation and/or autonomous driving. Therefore, the operation safety of autonomous vehicles may be enhanced as a result. Additionally or alternatively, the system may dynamically update the secondary map with the user-preferred routes/new routes, and thus, improving the user experience.

Figure 5:
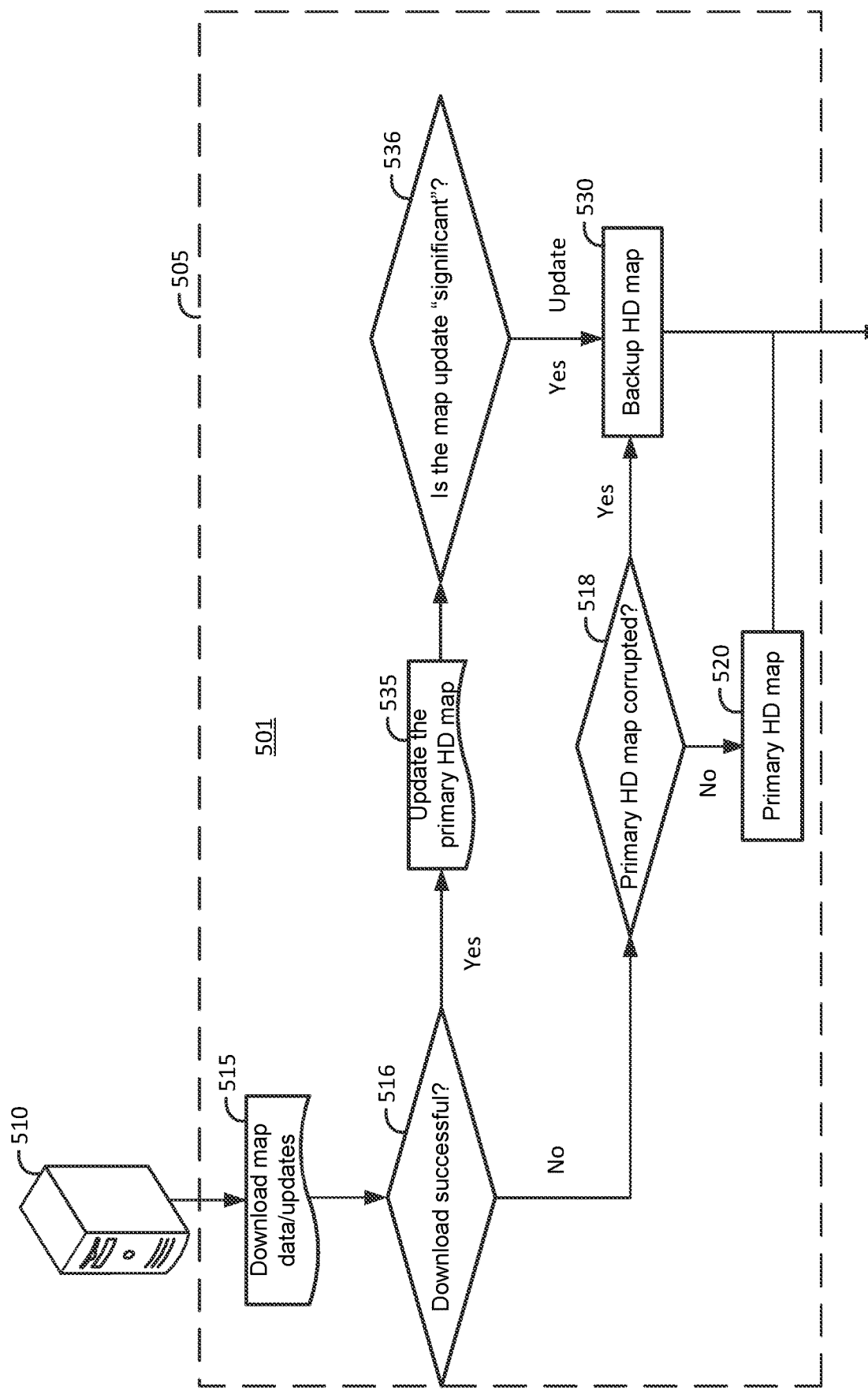
FIG. 5 is a high-level block diagram of a method for enhancing HD map reliability, according to some embodiments.

FIG. 5 is a high-level block diagram of a method for enhancing HD map reliability, according to some embodiments. In some embodiments, the functionality at block 505 may be performed by a mobile computing system 501 (e.g., corresponding to the mobile devices 145 and/or UE 105 in FIG. 1, and/or UE 205 in FIG. 2) associated with a vehicle (e.g., the vehicle 310 in FIG. 3), such as the mobile computing system 700 illustrated in FIG. 7 and described hereafter. A server 510 may be a proprietary server or any other suitable server, such as the computing system 800 illustrated in FIG. 8. Communication between the computing system 501 of the vehicle and the server 510 may be facilitated via a wireless network (e.g., the communication/positioning/sensing system in FIGS. 1 and/or 2).

At block 515, the mobile computing system 501 may check/detect if HD map data and/or one or more map update are available. If available, the mobile computing system 501 may download/receive the HD map data and/or one or more map update from the server 510. In some embodiments, the map update may account for changes in roads, traffic patterns, points of interest, etc., and may pertain to one or more primary HD maps (e.g., the primary maps) stored in a medium (local to the vehicle) that the mobile computing system 501 can access. In some embodiments, the mobile computing system 501 may check periodically (e.g., at a predetermined interval) for the map update.

At block 516, the mobile computing system 501 may determine if the download is successful. In some embodiments, unsuccessful download may be caused by outdated map updates and/or the map update being incompatible with primary HD maps. Additionally or alternatively, the unsuccessful download may also be caused by data transfer issues (e.g., incomplete transfers caused by interruptions or network connectivity problems).

Responsive to the download is unsuccessful (e.g., "No" at block 516), at block 518, the mobile computing system 501 may determine if the primary HD map (e.g., the in-use/working or to-be-used primary map) is corrupted. In some embodiments, the corruption of the HD map may be caused by different detectable events including, but not limited to (1) software or data errors (e.g., errors occur during the map creation process, data transmission, or during updates), (2) malicious tampering (e.g., unauthorized access to the vehicle's systems, hacking attempts, or the injection of malicious data into the map database), (3) physical damage or malfunction of the vehicle's hardware components, such as the GPS receiver or storage device (e.g., universal flash storage), (4) the downloaded map update being outdated or incompatible with the primary HD map, (5) data transfer issues, (6) software glitches.

Responsive to the primary HD map being not corrupted, at block 520, the mobile computing system 501 may output and/or use the primary HD map for navigation and/or autonomous driving.

Responsive to the primary HD map being corrupted, at block 530, the mobile computing system 501 may output and/or fallback to a backup map (e.g., rely on a secondary map) for navigation and/or autonomous driving.

Referring back to block 516, responsive to the download is successful, at block 535, the mobile computing system 501 may apply the map update to the primary HD map (e.g., update the primary HD map using the map update). The updated primary HD map may include road pattern changes representing the specific updates and modifications made to the primary HD map. Additionally or alternatively, the updated primary HD map may also include new routes, new markers/traffic information, new destinations, etc.

At block 536, the mobile computing system 501 may determine if the map update is "significant" (e.g., including "significant" feature changes). For example, the mobile computing system 501 may determine if the updated primary HD map includes one or more structural feature changes (e.g., "significant" feature changes) that correspond to real-world structural changes represented in the primary HD map. In some embodiments, the real-world structural change may include "permanent" changes (e.g., "significant" changes) that may have a long-term (e.g., longer than a year) impact on driving/routing of vehicles. Examples of "significant" changes may include but are not limited to the new lane addition to the road, new underpass/flyover, new road construction, new objects/road blockages, new traffic signs/lights, establishment of pedestrian zones or areas, implementation of new public transit and/or bicycle lanes, etc. If the map update includes one or more structural feature changes that correspond to real-world structural changes (e.g., "significant" changes) represented in the primary HD map, the map update may be considered "significant" for updating the backup map. In contrast, "temporary" or "dynamic" changes, such as road blockages, accident incidents, potholes, road maintenance, etc., that have an impact on driving/routing of the vehicles and are intended to be short-term (e.g., shorter than a few months), as well as changes that may not impact the driving of the vehicles, such as installation of non-traffic related signage (e.g., advertisements, informational boards), landscaping changes (e.g., planting new trees or gardens along the roadside), or modification or construction of buildings set back from the road that does not obstruct visibility or the roadway itself, may not be considered "significant" and may be filtered when updating the backup map.

In some embodiments, the structural feature changes of the updated HD map can be determined by assessing the differences between the updated HD map and the primary HD map. The differences can be determined using various techniques, such as feature-based comparison, machine learning, or statistical methods (e.g., determining if the difference exceeds a predetermined value), among others.

Responsive to the map update being "significant," the mobile computing system 501 may apply the map update (e.g., apply "significant" feature changes) to the backup map. Accordingly, the updated backup map may include the one or more structural feature changes of the updated primary HD map. Additionally or alternatively, the updated backup map may also include the user-preferred routes/new routes. As such, the backup map may include up-to-date and accurate data for navigation and/or autonomous driving, and thus may enhance the reliability of the HD map.

In some embodiments, when providing the updated primary HD map and the updated backup HD map for navigation, the mobile computing system 501 may (1) determine if the updated primary HD map is corrupted, (2) responsive to the updated primary HD map being corrupted, use the updated backup HD map for navigation, and (3) responsive to the updated primary HD map being not corrupted, use the updated primary HD map for navigation.

Figure 6:
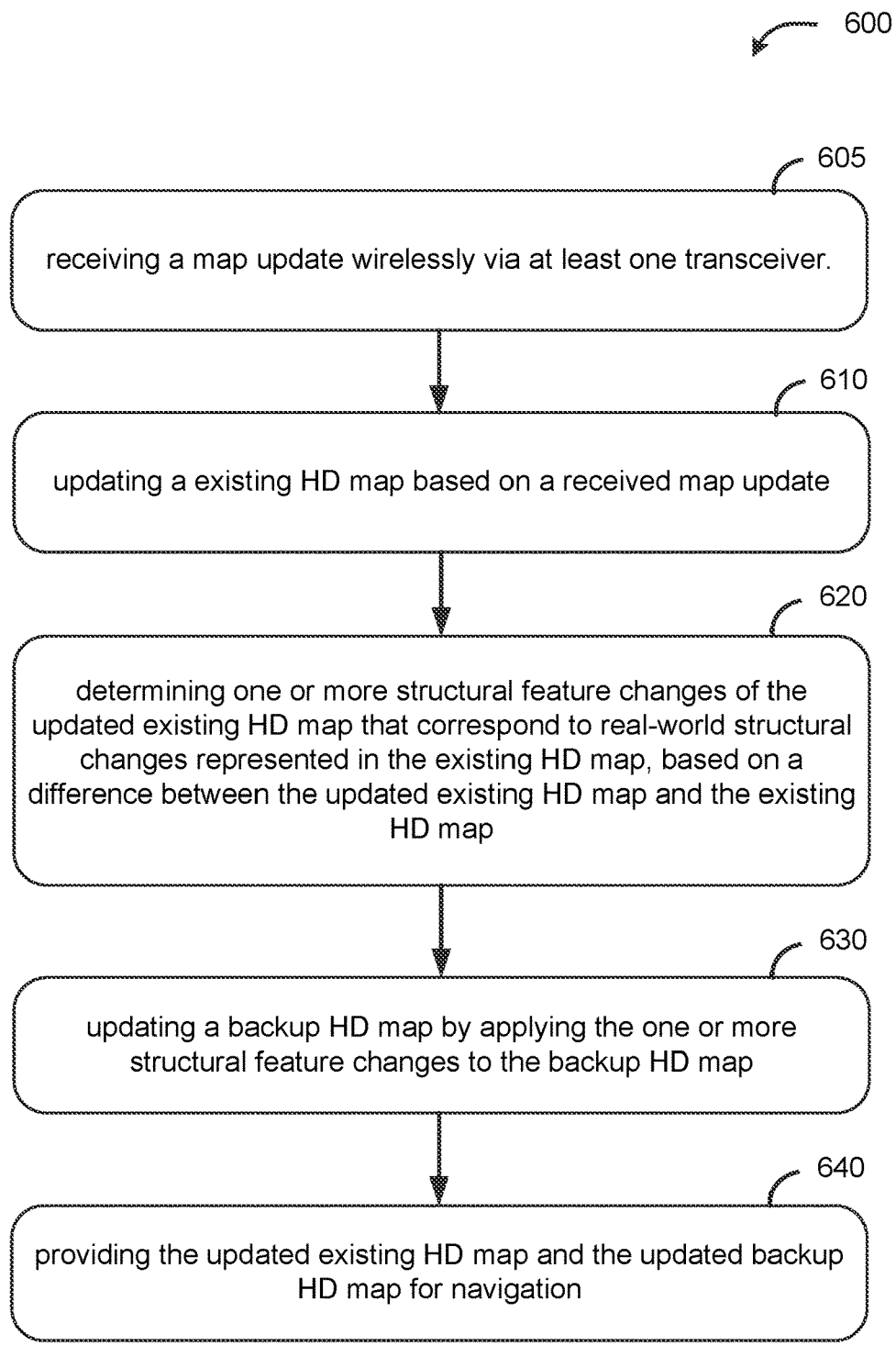
FIG. 6 is a flow diagram illustrating a method for enhancing HD map reliability, according to some embodiments.
Figure 7:
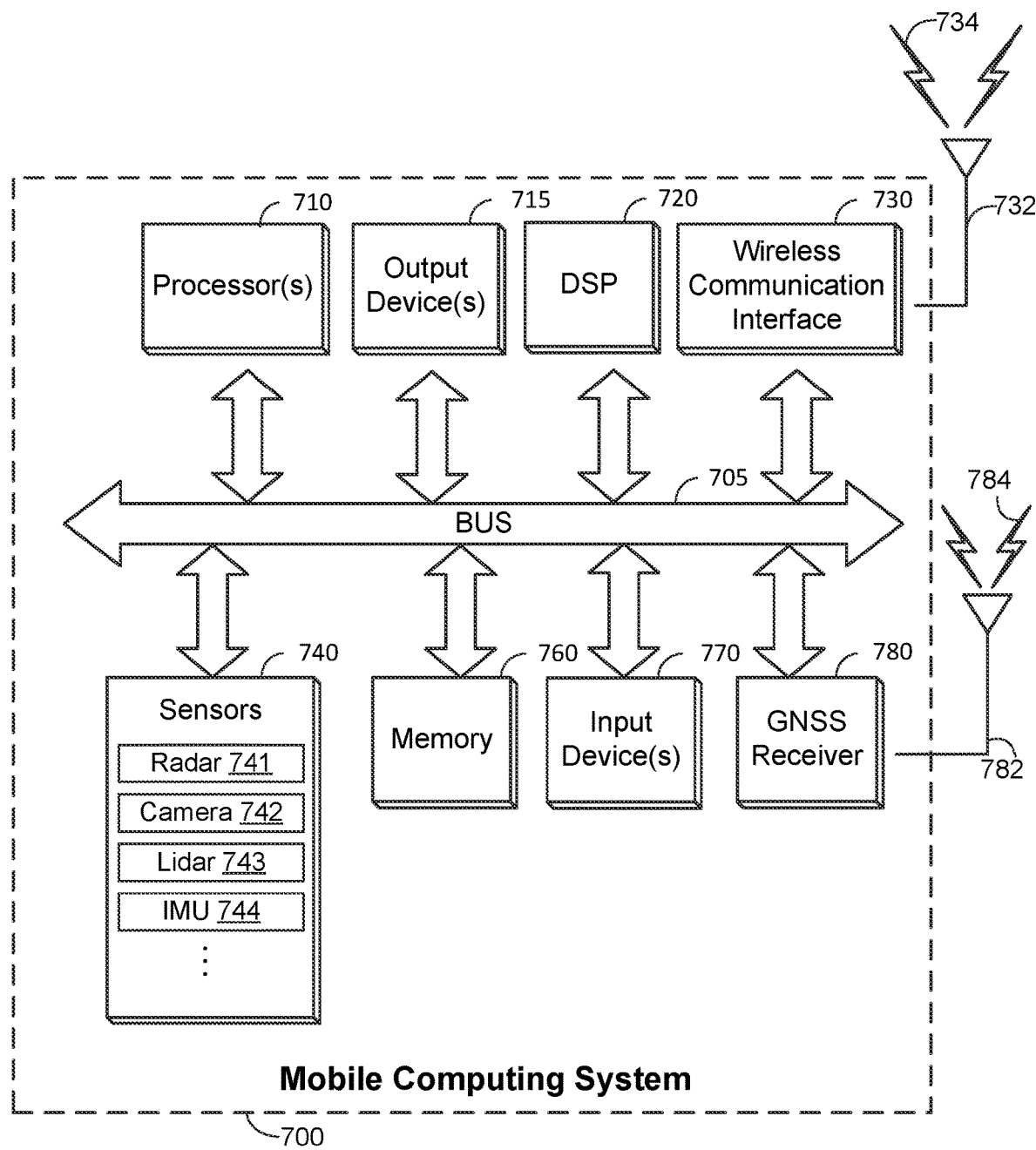
FIG. 7 is a block diagram of an embodiment of a mobile computing system, which can be utilized in embodiments as described herein.

FIG. 6 is a flow diagram of a method for enhancing HD map reliability performed by a UE, according to some embodiments. The UE may correspond to the mobile devices 145 and/or UE 105 in FIG. 1, UE 205. Means for performing the functionality illustrated in one or more of the blocks shown in FIG. 6 may be performed by hardware (e.g., processor(s)) and/or software components of a UE (e.g., UE 105), or a computer-readable apparatus including a storage medium storing computer-readable and/or computer-executable instructions that are configured to, when executed by a processor apparatus, cause the at least one processor apparatus or computerized apparatus to perform the operations. Example components of the UE (e.g., the mobile computing device 700) are illustrated in FIG. 7, which are described in more detail below. As noted above, the UE may be configured for/capable of performing HD map reliability enhancement.

It should also be noted that the operations of method 600 may be performed in any suitable order, not necessarily the order depicted in FIG. 6. Further, method 600 may include additional or fewer operations than those depicted in FIG. 6 to determine the feasibility.

At block 605, method 600 may include receiving a map update wirelessly via at least one transceiver.

Means for performing functionality at block 605 may comprise a bus 705, processor(s) 710, wireless communication interface 730, memory 760, and/or other components of a UE 105, as illustrated in FIG. 7.

At block 610, method 600 may include updating a primary HD map based on a received map update. As discussed above, in some embodiments, the UE may check/detect if HD map data and/or one or more map updates are available. If available, the UE may download the HD map data and/or one or more map updates from the server (e.g., the server 510 in FIG. 5). In some embodiments, the map update may account for changes in roads, traffic patterns, points of interest, etc., and may pertain to one or more primary HD maps (e.g., the primary maps) stored in a medium (local to the vehicle) that the UE can access. Additionally or alternatively, the updated primary HD map may also include new routes, new markers/traffic information, new destinations, etc. In some embodiments, the UE may check periodically (e.g., at a predetermined interval) for the map update.

Means for performing functionality at block 610 may comprise a bus 705, processor(s) 710, wireless communication interface 730, memory 760, and/or other components of a UE 105, as illustrated in FIG. 7.

At block 620, method 600 may include determining one or more structural feature changes of the updated primary HD map that correspond to real-world structural changes represented in the primary HD map, based on a difference between the updated primary HD map and the primary HD map.

In some embodiments, the real-world structural changes may comprise (1) new lane additions, (2) underpass constructions, (3) flyover constructions, (4) new road constructions, or any combination thereof.

In some embodiments, determining the one or more structural feature changes of the updated primary HD map further comprises filtering out temporary feature changes of the updated primary HD map that correspond to (1) accidents, (2) road blockages, (3) potholes, or any combinations thereof.

In some embodiments, the structural feature changes of the updated HD map may be determined by assessing the differences between the updated HD map and the primary HD map. The differences can be determined using various techniques, such as feature-based comparison, machine learning, or statistical methods (e.g., determining if the difference exceeds a predetermined value), among others.

Means for performing functionality at block 620 may comprise a bus 705, processor(s) 710, wireless communication interface 730, memory 760, and/or other components of a UE 105, as illustrated in FIG. 7.

At block 630, method 600 may comprise updating a backup HD map by applying the one or more structural feature changes to the backup HD map.

In some embodiments, responsive to the map update being "significant," the mobile computing system 501 may apply the map update to the backup map. The updated backup map may include the one or more structural feature changes of the updated primary HD map. Additionally or alternatively, the updated backup map may also include the user-preferred routes/new routes. As such, the backup map may also include up-to-date and accurate data in navigation and/or autonomous driving and thus may enhance the reliability of the HD map.

Means for performing functionality at block 630 may comprise a bus 705, processor(s) 710, wireless communication interface 730, memory 760, and/or other components of a UE 105, as illustrated in FIG. 7.

At block 640, method 600 may include providing the updated primary HD map and the updated backup HD map for navigation.

In some embodiments, providing the updated primary HD map and the updated backup HD map for navigation further comprises providing the updated primary HD map and the updated backup HD map for vehicle navigation (e.g., autonomous driving).

In some embodiments, providing the updated primary HD map and the updated backup HD map for navigation further comprises (1) determining if the updated primary HD map is corrupted, (2) responsive to the updated primary HD map being corrupted, using the updated backup HD map for navigation, and (3) responsive to the updated primary HD map being not corrupted, using the updated primary HD map for navigation.

Means for performing functionality at block 640 may comprise a bus 705, processor(s) 710, wireless communication interface 730, memory 760, and/or other components of a UE 105, as illustrated in FIG. 7.

In some embodiments, method 600 further comprises determining if updating the primary HD map is successful. Responsive to updating the primary HD map being unsuccessful, method 600 further comprises (1) determining if the primary HD map is corrupted, (2) responsive to the primary HD map being corrupted, using the backup HD map for navigation, and (3) responsive to the primary HD map being not corrupted, using the primary HD map for navigation.

In some embodiments, whether the primary HD map is corrupted is determined based on determining (1) software errors, (2) data errors, (3) malicious tampering, (4) malfunctions, (5) incompatible map updates, (6) data transfer issues, (7) software glitches, or any combination thereof.

FIG. 7 is a block diagram of an embodiment of a mobile computing system 700, which can be incorporated into a vehicle and utilized as described herein above (e.g., in association with FIGS. 1-6) to enable the vehicle to perform the functions of the embodiments described herein. For example, the mobile computing system 700 can perform one or more of the functions of the method shown in FIGS. 3, 4, 5 and 6. It should be noted that FIG. 7 is meant only to provide a generalized illustration of various components, any or all of which may be utilized as appropriate. It can be noted that, in some instances, components illustrated by FIG. 7 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 7.

The mobile computing system 700 is shown comprising hardware elements that can be electrically coupled via a bus 705 (or may otherwise be in communication, as appropriate), which may include a vehicle-specific bus such as a Controller Area Network (CAN) bus. The hardware elements may include a processor(s) 710 which can include without limitation one or more general-purpose processors (e.g., an application processor), one or more special-purpose processors (such as DSP chips, graphics acceleration processors, application-specific integrated circuits (ASICs), and/or the like), and/or other processing structures or means. Processor(s) 710 may comprise one or more processing units, which may be housed in a single integrated circuit (IC) or multiple ICs. As shown in FIG. 7, some embodiments may have a separate DSP 720, depending on desired functionality. Location determination and/or other determinations based on wireless communication may be provided in the processor(s) 710 and/or wireless communication interface 730 (discussed below). The mobile computing system 700 also can include one or more input devices 770, which can include without limitation one or more keyboards, touch screens, touch pads, microphones, buttons, dials, switches, and/or the like; and one or more output devices 715, which can include without limitation one or more displays (e.g., touch screens), light emitting diodes (LEDs), speakers, and/or the like.

The mobile computing system 700 may also include a wireless communication interface 730, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile computing system 700 to communicate with other devices as described in the embodiments above. The wireless communication interface 730 may permit data and signaling to be communicated (e.g., transmitted and received) with transmission/reception points (TRPs) of a network, for example, via cellular base stations (e.g., eNBs, gNBs, ng-eNBs, etc.), access points, and/or other access node types, and/or other network components, computer systems, and/or any other electronic devices communicatively coupled with TRPs, as described herein. The communication can be carried out via one or more wireless communication antenna(s) 732 that send and/or receive wireless signals 734. According to some embodiments, the wireless communication antenna(s) 732 may comprise a plurality of discrete antennas, antenna arrays, or any combination thereof. The antenna(s) 732 may be capable of transmitting and receiving wireless signals using beams (e.g., Tx beams and Rx beams). Beam formation may be performed using digital and/or analog beam formation techniques, with respective digital and/or analog circuitry. The wireless communication interface 730 may include such circuitry.

Depending on desired functionality, the wireless communication interface 730 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile computing system 700 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement Global System for Mobile communications (GSM), Digital Advanced Mobile Phone System (D-AMPS), or some other radio access technology (RAT). An OFDMA network may employ long-term evolution (LTE), LTE Advanced, fifth generation (5G) new radio (NR), and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile computing system 700 can further include sensors 740. Sensor(s) 740 may correspond to sensors 405 of FIG. 4, and may therefore include a radar 741, camera 742, and other sensors. As illustrated, sensors 740 may further comprise lidar 743, IMU 744, and more. Sensors 740 may further comprise accelerometer(s), gyroscope(s), magnetometer(s), altimeter(s), microphone(s), proximity sensor (s), light sensor(s), barometer(s), sonar, and/or sensors from vehicle systems (e.g., wheel sensors, speedometer, etc.). As described herein, sensors may be used to obtain information regarding position and/or movement.

Embodiments of the mobile computing system 700 may also include a GNSS receiver 780 (e.g., corresponding to GNSS unit 430 of FIG. 4) capable of receiving signals 784 from one or more GNSS satellites using an antenna 782 (which could be the same as antenna 732). Positioning based on GNSS signal measurement can be utilized to complement and/or incorporate the techniques described herein. The GNSS receiver 780 can extract a position of the mobile computing system 700, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 780 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 780 is illustrated in FIG. 7 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 710, DSP 720, and/or a processor within the wireless communication interface 730 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 710 or DSP 720.

The mobile computing system 700 may further include and/or be in communication with a memory 760. The memory 760 can include, without limitation, local and/or network-accessible storage, a disk drive, a drive array, an optical storage device, a solid-state storage device, such as a random-access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 760 of the mobile computing system 700 also can comprise software elements (not shown in FIG. 7), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 760 that are executable by the mobile computing system 700 (and/or processor(s) 710 or DSP 720 within mobile computing system 700). In some embodiments, then, such code and/or instructions can be used to configure and/or adapt a general-purpose computer (or other device) to perform one or more operations in accordance with the described methods.

Figure 8:
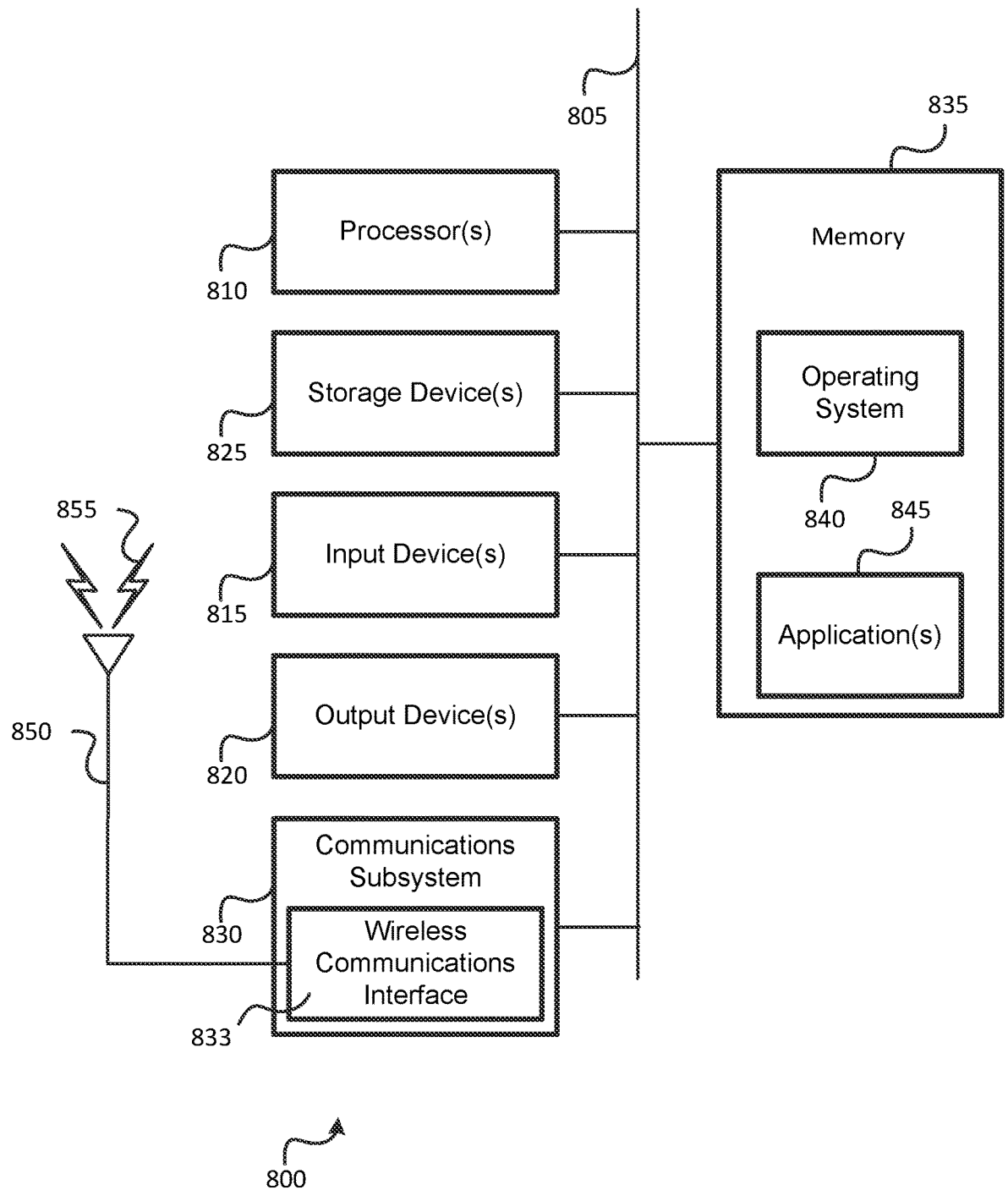
FIG. 8 is a block diagram of an embodiment of a computer system, which can be utilized in embodiments as described herein.

FIG. 8 is a block diagram of an embodiment of a computer system 800, which may be used, in whole or in part, to provide the functions of a server or other computing device as described in the embodiments herein (e.g., the cloud/edge server described with respect to FIGS. 1-6). It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner. In addition, it can be noted that components illustrated by FIG. 8 can be localized to a single device and/or distributed among various networked devices, which may be disposed at different geographical locations.

The computer system 800 is shown comprising hardware elements that can be electrically coupled via a bus 805 (or may otherwise be in communication, as appropriate). The hardware elements may include processor(s) 810, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 800 also may comprise one or more input devices 815, which may comprise without limitation a mouse, a keyboard, a camera, a microphone, and/or the like; and one or more output devices 820, which may comprise without limitation a display device, a printer, and/or the like.

The computer system 800 may further include (and/or be in communication with) one or more non-transitory storage devices 825, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 800 may also include a communications subsystem 830, which may comprise wireless communication technologies managed and controlled by a wireless communication interface 833, as well as wired technologies (such as Ethernet, coaxial communications, universal serial bus (USB), and the like). The wireless communication interface 833 may comprise one or more wireless transceivers that may send and receive wireless signals 855 (e.g., signals according to 5G NR or LTE) via wireless antenna(s) 850. Thus the communications subsystem 830 may comprise a modem, a network card (wireless or wired), an infrared communication device, a wireless communication device, and/or a chipset, and/or the like, which may enable the computer system 800 to communicate on any or all of the communication networks described herein to any device on the respective network, including a User Equipment (UE), base stations and/or other TRPs, and/or any other electronic devices described herein. Hence, the communications subsystem 830 may be used to receive and send data as described in the embodiments herein.

In many embodiments, the computer system 800 will further comprise a working memory 835, which may comprise a RAM or ROM device, as described above. Software elements, shown as being located within the working memory 835, may comprise an operating system 840, device drivers, executable libraries, and/or other code, such as one or more applications 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 825 described above. In some cases, the storage medium might be incorporated within a computer system, such as computer system 800. In other embodiments, the storage medium might be separate from a computer system (e.g., a removable medium, such as an optical disc), and/or provided in an installation package, such that the storage medium can be used to program, configure, and/or adapt a general-purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special-purpose computer or a similar special-purpose electronic computing device. In the context of this specification, therefore, a special-purpose computer or a similar special-purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. An example method for enhancing high-definition (HD) map reliability, the method performed by a UE and comprising receiving a map update wirelessly via at least one transceiver, updating a primary HD map based on a received map update, determining one or more structural feature changes of the updated primary HD map that correspond to real-world structural changes represented in the primary HD map, based on a difference between the updated primary HD map and the primary HD map, and updating a backup HD map by applying the one or more structural feature changes to the backup HD map. The method further comprises providing the updated primary HD map and the updated backup HD map for navigation.

Clause 2. The method of clause 1, wherein the real-world structural changes comprise: new lane additions; underpass constructions; flyover constructions; new road constructions; or any combination thereof.

Clause 3. The method of clause 1 or 2, wherein determining the one or more structural feature changes of the updated primary HD map further comprises: filtering out temporary feature changes of the updated primary HD map that correspond to: accidents; road blockages; potholes; or any combinations thereof.

Clause 4. The method of any of clauses 1-3, wherein providing the updated primary HD map and the updated backup HD map for navigation further comprises: providing the updated primary HD map and the updated backup HD map for vehicle navigation.

Clause 5. The method of any of clauses 1-4, further comprising: determining if the updated primary HD map is corrupted; responsive to the updated primary HD map being corrupted, using the updated backup HD map for navigation; and responsive to the updated primary HD map being not corrupted, using the updated primary HD map for navigation.

Clause 6. The method of any of clauses 1-5, further comprising determining if updating the primary HD map is successful, wherein responsive to updating the primary HD map being unsuccessful, the method further comprises: determining if the primary HD map is corrupted; responsive to the primary HD map being corrupted, using the backup HD map for navigation; and responsive to the primary HD map being not corrupted, using the primary HD map for navigation.

Clause 7. The method of any clauses 1-6, determining whether the primary HD map is corrupted is based on determining: software errors; data errors; malicious tampering; malfunctions; incompatible map updates; data transfer issues; software glitches; or any combination thereof in the primary HD map.

Clause 8. The method of any of clauses 1-7, wherein the map update comprises: changes in optimal routes; change in route preference; or any combination thereof.

Clause 9. An example UE for enhancing high-definition (HD) map reliability comprising one or more transceivers, one or more memories, and one or more processors communicatively coupled with the one or more transceivers and the one or more memories. The one or more processors are configured to receive a map update wirelessly via the one or more transceivers, update to a primary HD map based on a received map update, determine one or more structural feature changes of the updated primary HD map that correspond to real-world structural changes represented in the primary HD map, wherein based on a difference between the updated primary HD map and the primary HD map, and update a backup HD map by applying the one or more structural feature changes to the backup HD map. The one or more processors are configured to provide the updated primary HD map and the updated backup HD map for navigation.

Clause 10. The UE of clause 9, wherein the real-world structural changes comprise: new lane additions; underpass constructions; flyover constructions; new road constructions; or any combination thereof.

Clause 11. The UE of clause 9 or 10, wherein to determine the one or more structural feature changes of the updated primary HD map, the one or more processors are further configured to: filter out temporary feature changes of the updated primary HD map that correspond to: accidents; road blockages; potholes; or any combinations thereof.

Clause 12. The UE of any of clauses 9-11, wherein the one or more processors are further configured to: provide the updated primary HD map and the updated backup HD map for vehicle navigation.

Clause 13. The UE of any of clauses 9-12, wherein the one or more processors are further configured to: determine if the updated primary HD map is corrupted; responsive to the updated primary HD map being corrupted, use the updated backup HD map for navigation; and responsive to the updated primary HD map being not corrupted, using the updated primary HD map for navigation.

Clause 14. The UE of any of clauses 9-13, wherein the one or more processors are further configured to determine if updating the primary HD map is successful, wherein responsive to updating the primary HD map being unsuccessful, the method further comprises: determining if the primary HD map is corrupted; responsive to the primary HD map being corrupted, using the backup HD map for navigation; and responsive to the primary HD map being not corrupted, using the primary HD map for navigation.

Clause 15. The UE of any of clauses 9-14, wherein, to determine whether the primary HD map is corrupted, the one or more processors are configured to determine: software errors; data errors; malicious tampering; malfunctions; incompatible map updates; data transfer issues; software glitches; or any combination thereof in the primary HD map.

Clause 16. The UE of any of clauses 9-15, wherein the map update comprises: changes in optimal routes; change in route preference; or any combination thereof.

Clause 17. An example apparatus for enhancing high-definition (HD) map reliability, the apparatus comprising means for receiving a map update wirelessly via at least one transceiver, means for updating to a primary HD map based on a received map update, means for determining one or more structural feature changes of the updated primary HD map that correspond to real-world structural changes represented in the primary HD map, based on a difference between the updated primary HD map and the primary HD map, and means for updating a backup HD map by applying the one or more structural feature changes to the backup HD map. The apparatus further comprises means for providing the updated primary HD map and the updated backup HD map for navigation.

Clause 18. The apparatus of clause 17, wherein the real-world structural changes comprise: new lane additions; underpass constructions; flyover constructions; new road constructions; or any combination thereof.

Clause 19. The apparatus of clause 17 or 18, wherein the means for determining the one or more structural feature changes of the updated primary HD map further comprises: means for filtering out temporary feature changes of the updated primary HD map that correspond to: accidents; road blockages; potholes; or any combinations thereof.

Clause 20. The apparatus of any of clauses 17-19, wherein the means for providing the updated primary HD map and the updated backup HD map for navigation further comprises: means for providing the updated primary HD map and the updated backup HD map for vehicle navigation.

Clause 21. The apparatus of any of clauses 17-20, wherein the apparatus further comprises: means for determining if the updated primary HD map is corrupted; responsive to the updated primary HD map being corrupted, means for using the updated backup HD map for navigation; and responsive to the updated primary HD map being not corrupted, means for using the updated primary HD map for navigation.

Clause 22. The apparatus of any of clauses 17-21, further comprising means for determining if updating the primary HD map is successful, wherein responsive to updating the primary HD map being unsuccessful, the apparatus further comprises: means for determining if the primary HD map is corrupted; responsive to the primary HD map being corrupted, means for using the backup HD map for navigation; and responsive to the primary HD map being not corrupted, means for using the primary HD map for navigation.

Clause 23. The apparatus of any of clauses 17-22, wherein means for determining whether the primary HD map is corrupted comprises means for determining: software errors; data errors; malicious tampering; malfunctions; incompatible map updates; data transfer issues; software glitches; or any combination thereof in the primary HD map.

Clause 24. The apparatus of any of clauses 17-23, wherein the map update comprises: changes in optimal routes; change in route preference; or any combination thereof.

Clause 25. An example non-transitory computer-readable medium storing instructions for enhancing high-definition (HD) map reliability, the instructions comprising code for receiving a map update wirelessly via at least one transceiver, updating a primary HD map based on a received map update, determining one or more structural feature changes of the updated primary HD map that correspond to real-world structural changes represented in the primary HD map, based on a difference between the updated primary HD map and the primary HD map, and updating a backup HD map by applying the one or more structural feature changes to the backup HD map. The instructions further comprise code for providing the updated primary HD map and the updated backup HD map for navigation.

Clause 26. The non-transitory computer-readable medium of clause 25, wherein the real-world structural changes comprise: new lane additions; underpass constructions; flyover constructions; new road constructions; or any combination thereof.

Clause 27. The non-transitory computer-readable medium of clause 25 or 26, wherein the code for determining the one or more structural feature changes of the updated primary HD map further comprise code for: filtering out temporary feature changes of the updated primary HD map that correspond to: accidents; road blockages; potholes; or any combinations thereof.

Clause 28. The non-transitory computer-readable medium of any clauses of 25-27, wherein the code for determining the one or more structural feature changes of the updated primary HD map further comprise code for: providing the updated primary HD map and the updated backup HD map for vehicle navigation.

Clause 29. The non-transitory computer-readable medium of any clauses of 25-28, wherein the instructions further comprise code for: determining if the updated primary HD map is corrupted; responsive to the updated primary HD map being corrupted, using the updated backup HD map for navigation; and responsive to the updated primary HD map being not corrupted, using the updated primary HD map for navigation.

Clause 30. The non-transitory computer-readable medium of any clauses of 25-29, wherein the instructions further comprise code for determining if updating the primary HD map is successful, wherein responsive to updating the primary HD map being unsuccessful, the instructions further comprise code for: determining if the primary HD map is corrupted; responsive to the primary HD map being corrupted, using the backup HD map for navigation; and responsive to the primary HD map being not corrupted, using the primary HD map for navigation.

What is claimed is:

1. A method for enhancing high-definition (HD) map reliability, the method performed by a User Equipment (UE) and comprising:
   receiving a map update wirelessly via at least one transceiver;
   generating an updated primary HD map based on applying the received map update to a primary HD map;
   determining one or more structural feature changes of the updated primary HD map that correspond to real-world structural changes represented in the primary HD map, based on an analysis of differences between the updated primary HD map and the primary HD map using one or a combination of feature analysis techniques;
   updating a backup HD map by applying the one or more structural feature changes to the backup HD map, wherein the backup HD map serves as a fallback navigation map should the updated primary HD map be corrupted; and
   providing the updated primary HD map and the updated backup HD map for navigation.

2. The method of claim 1, wherein the real-world structural changes comprise:
   new lane additions;
   underpass constructions;
   flyover constructions;
   new road constructions; or
   any combination thereof.

3. The method of claim 2, wherein determining the one or more structural feature changes of the updated primary HD map further comprises:
   filtering out temporary feature changes of the updated primary HD map that correspond to:
   accidents;
   road blockages;
   potholes; or
   any combinations thereof.

4. The method of claim 1, wherein providing the updated primary HD map and the updated backup HD map for navigation further comprises:
   providing the updated primary HD map and the updated backup HD map for vehicle navigation.

5. The method of claim 1, further comprising:
   determining if the updated primary HD map is corrupted;

responsive to the updated primary HD map being corrupted, using the updated backup HD map for navigation; and responsive to the updated primary HD map not being corrupted, using the updated primary HD map for navigation.

6. The method of claim 1, further comprising determining if updating the primary HD map is successful, wherein responsive to updating the primary HD map being unsuccessful, the method further comprises:
determining if the primary HD map is corrupted;
responsive to the primary HD map being corrupted, using the backup HD map for navigation; and
responsive to the primary HD map being not corrupted, using the primary HD map for navigation.

7. The method of claim 6, wherein determining whether the primary HD map is corrupted is based on determining:
software errors;
data errors;
malicious tampering;
malfunctions;
incompatible map updates;
data transfer issues;
software glitches; or
any combination thereof in the primary HD map.

8. The method of claim 1, wherein the map update comprises:
changes in optimal routes;
change in route preference; or
any combination thereof.

9. A User Equipment (UE) for enhancing high-definition (HD) map reliability comprising:
one or more transceivers;
one or more memories; and
one or more processors communicatively coupled with the one or more transceivers and the one or more memories, wherein the one or more processors are configured to:
receive a map update wirelessly via the one or more transceivers;
generate an updated primary HD map based on applying the received map update to a primary HD map;
determine one or more structural feature changes of the updated primary HD map that correspond to real-world structural changes represented in the primary HD map, based on an analysis of differences between the updated primary HD map and the primary HD map using one or a combination of feature analysis techniques;
update a backup HD map by applying the one or more structural feature changes to the backup HD map, wherein the backup HD map serves as a fallback navigation map should the updated primary HD map be corrupted; and
provide the updated primary HD map and the updated backup HD map for navigation.

10. The User Equipment of claim 9, wherein the real-world structural changes comprise:
new lane additions;
underpass constructions;
flyover constructions;
new road constructions; or
any combination thereof.

11. The User Equipment of claim 10, wherein, to determine the one or more structural feature changes of the updated primary HD map, the one or more processors are further configured to:

filter out temporary feature changes of the updated primary HD map that correspond to:
accidents;
road blockages;
potholes; or
any combinations thereof.

12. The User Equipment of claim 9, wherein, to provide the updated primary HD map and the updated backup HD map for navigation, the one or more processors are further configured to:
provide the updated primary HD map and the updated backup HD map for vehicle navigation.

13. The User Equipment of claim 9, wherein the one or more processors are further configured to:
determine if the updated primary HD map is corrupted;
responsive to the updated primary HD map being corrupted, use the updated backup HD map for navigation; and
responsive to the updated primary HD map being not corrupted, use the updated primary HD map for navigation.

14. The User Equipment of claim 9, wherein the one or more processors are further configured to determine if updating the primary HD map is successful, wherein responsive to updating the primary HD map being unsuccessful, the one or more processors are further configured to:
determine if the primary HD map is corrupted;
responsive to the primary HD map being corrupted, use the backup HD map for navigation; and
responsive to the primary HD map being not corrupted, use the primary HD map for navigation.

15. The User Equipment of claim 14, wherein, to determine whether the primary HD map is corrupted, the one or more processors are configured to determine:
software errors;
data errors;
malicious tampering;
malfunctions;
incompatible map updates;
data transfer issues;
software glitches; or
any combination thereof in the primary HD map.

16. The User Equipment of claim 9, wherein the map update comprises:
changes in optimal routes;
change in route preference; or
any combination thereof.

17. An apparatus for enhancing high-definition (HD) map reliability, the apparatus comprising:
means for receiving a map update wirelessly via at least one transceiver;
means for generating an updated primary HD map based on applying the received map update to a primary HD map;
means for determining one or more structural feature changes of the updated primary HD map that correspond to real-world structural changes represented in the primary HD map, based on an analysis of differences between the updated primary HD map and the primary HD map using one or a combination of feature analysis techniques;
means for updating a backup HD map by applying the one or more structural feature changes to the backup HD map, wherein the backup HDD map serves as a fallback navigation map should the updated primary HD map be corrupted; and means for providing the updated primary HD map and the updated backup HD map for navigation.

18. The apparatus of claim 17, wherein the real-world structural changes comprise:
   new lane additions;
   underpass constructions;
   flyover constructions;
   new road constructions; or
   any combination thereof.

19. The apparatus of claim 18, wherein the means for determining the one or more structural feature changes of the updated primary HD map further comprises:
   means for filtering out temporary feature changes of the updated primary HD map that correspond to:
      accidents;
      road blockages;
      potholes; or
      any combinations thereof.

20. The apparatus of claim 17, wherein the apparatus further comprises:
   means for providing the updated primary HD map and the updated backup HD map for vehicle navigation.

21. The apparatus of claim 17, wherein the apparatus further comprises:
   means for determining if the updated primary HD map is corrupted;
   responsive to the updated primary HD map being corrupted, means for using the updated backup HD map for navigation; and
   responsive to the updated primary HD map being not corrupted, means for using the updated primary HD map for navigation.

22. The apparatus of claim 17, wherein the apparatus further comprises means for determining if updating the primary HD map is successful, wherein responsive to updating the primary HD map being unsuccessful, the apparatus further comprises:
   means for determining if the primary HD map is corrupted;
   responsive to the primary HD map being corrupted, means for using the backup HD map for navigation; and
   responsive to the primary HD map being not corrupted, means for using the primary HD map for navigation.

23. The apparatus of claim 22, wherein means for determining whether the primary HD map is corrupted comprises means for determining:
   software errors;
   data errors;
   malicious tampering;
   malfunctions;
   incompatible map updates;
   data transfer issues;
   software glitches; or
   any combination thereof in the primary HD map.

24. The apparatus of claim 17, wherein the map update comprises:
   changes in optimal routes;
   change in route preference; or
   any combination thereof.

25. A non-transitory computer-readable medium storing instructions for enhancing high-definition (HD) map reliability, the instructions comprising code for:
   receiving a map update wirelessly via at least one transceiver;
   generating an updated primary HD map based on applying the received map update to a primary HD map;
   determining one or more structural feature changes of the updated primary HD map that correspond to real-world structural changes represented in the primary HD map, based on an analysis of differences between the updated primary HD map and the primary HD map using one or a combination of feature analysis techniques;
   updating a backup HD map by applying the one or more structural feature changes to the backup HD map, wherein the backup HD map serves as a fallback navigation map should the updated primary HD map be corrupted; and
   providing the updated primary HD map and the updated backup HD map for navigation.

26. The computer-readable medium of claim 25, wherein the real-world structural changes comprise:
   new lane additions;
   underpass constructions;
   flyover constructions;
   new road constructions; or
   any combination thereof.

27. The computer-readable medium of claim 26, wherein the code for determining the one or more structural feature changes of the updated primary HD map further comprise code for:
   filtering out temporary feature changes of the updated primary HD map that correspond to:
      accidents;
      road blockages;
      potholes; or
      any combinations thereof.

28. The computer-readable medium of claim 25, wherein the code for determining the one or more structural feature changes of the updated primary HD map further comprise code for:
   providing the updated primary HD map and the updated backup HD map for vehicle navigation.

29. The computer-readable medium of claim 25, wherein the instructions further comprise code for:
   determining if the updated primary HD map is corrupted;
   responsive to the updated primary HD map being corrupted, using the updated backup HD map for navigation; and
   responsive to the updated primary HD map being not corrupted, using the updated primary HD map for navigation.

30. The computer-readable medium of claim 25, wherein the instructions further comprise code for determining if updating the primary HD map is successful, wherein responsive to updating the primary HD map being unsuccessful, the instructions further comprise code for:
   determining if the primary HD map is corrupted;
   responsive to the primary HD map being corrupted, using the backup HD map for navigation; and
   responsive to the primary HD map being not corrupted, using the primary HD map for navigation.

* * * * *